United States Patent
Edwards et al.

(10) Patent No.: US 11,762,369 B2
(45) Date of Patent: Sep. 19, 2023

(54) ROBOTIC CONTROL VIA A VIRTUAL WORLD SIMULATION

(71) Applicant: Sensory Robotics, Inc., New Castle, DE (US)

(72) Inventors: Chris Edwards, Cincinnati, OH (US); Tristan Fogt, Gladwyne, PA (US)

(73) Assignee: Sensory Robotics, Inc., New Castle, DE (US)

(*) Notice: Subject to any disclaimer, the term of this patent is extended or adjusted under 35 U.S.C. 154(b) by 373 days.

(21) Appl. No.: 16/783,974

(22) Filed: Feb. 6, 2020

(65) Prior Publication Data
US 2020/0249654 A1    Aug. 6, 2020

Related U.S. Application Data

(60) Provisional application No. 62/802,081, filed on Feb. 6, 2019.

(51) Int. Cl.
*B25J 9/16* (2006.01)
*G05B 19/414* (2006.01)

(52) U.S. Cl.
CPC .......... *G05B 19/414* (2013.01); *B25J 9/1615* (2013.01); *B25J 9/1671* (2013.01); *B25J 9/1676* (2013.01);
(Continued)

(58) Field of Classification Search
CPC ...... B25J 9/1671; B25J 9/1605; B25J 9/1689; B25J 9/1676; B25J 9/1615; B25J 3/00;
(Continued)

(56) References Cited

U.S. PATENT DOCUMENTS 6,016,385 A     1/2000  Yee et al.
6,144,884 A *  11/2000  Niemeyer .............. B25J 9/1689
                                                        709/204
(Continued)

FOREIGN PATENT DOCUMENTS

GB    2400686 A    10/2004
WO    9709153 A1    3/1997
(Continued)

OTHER PUBLICATIONS

Spong, Hutchinson, and Vidyasagar. "Robot Modeling and Control", John Wiley & Sons, 2006 (419 pages).
(Continued)

*Primary Examiner* — Khoi H Tran
*Assistant Examiner* — Tanner L Cullen
(74) *Attorney, Agent, or Firm* — Mendelsohn Dunleavy, P.C.; Steve Mendelsohn

(57) ABSTRACT

A system has a virtual-world (VW) controller and a physical-world (PW) controller. The pairing of a PW element with a VW element establishes them as corresponding physical and virtual twins. The VW controller and/or the PW controller receives measurements from one or more sensors characterizing aspects of the physical world, the VW controller generates the virtual twin, and the VW controller and/or the PW controller generates commands for one or more actuators affecting aspects of the physical world. To coordinate the corresponding virtual and physical twins, (i) the VW controller controls the virtual twin based on the physical twin or (ii) the PW controller controls the physical twin based on the virtual twin. Depending on the operating mode, one of the VW and PW controllers is a master controller, and the other is a slave controller, where the virtual and physical twins are both controlled based on one of VW or PW forces.

11 Claims, 13 Drawing Sheets

(52) U.S. Cl.
CPC .............. *G05B 2219/39014* (2013.01); *G05B 2219/40407* (2013.01); *G05B 2219/50391* (2013.01)

(58) Field of Classification Search
CPC ..... B25J 9/0081; B25J 9/0006; G05B 19/414; G05B 2219/39014; G05B 2219/40407; G05B 2219/40091; G05B 2219/40323; G05B 2219/40131; G05B 2219/39451; G05B 2219/50391; A61B 34/10; A61B 5/744; G06T 19/006; A63B 2024/0096; A63F 2300/5553; A63F 2300/8082; A63F 13/825
See application file for complete search history.

(56) References Cited

U.S. PATENT DOCUMENTS

| | | | |
|---|---|---|---|
| 6,741,911 | B2 | 5/2004 | Simmons |
| 9,643,314 | B2 | 5/2017 | Guerin et al. |
| 9,671,777 | B1 | 6/2017 | Aichele et al. |
| 9,811,074 | B1 | 11/2017 | Aichele et al. |
| 10,078,712 | B2 | 9/2018 | Bacon et al. |
| 10,095,031 | B1 | 10/2018 | Katz et al. |
| 10,207,407 | B1 | 2/2019 | Kuffner |
| 10,245,731 | B2 | 4/2019 | Linnell |
| 10,556,336 | B1 | 2/2020 | Bai |
| 2002/0133264 | A1* | 9/2002 | Maiteh ............... G05B 19/4097 700/86 |
| 2016/0046023 | A1* | 2/2016 | Nagendran ............ B25J 9/1605 700/258 |
| 2016/0354933 | A1* | 12/2016 | Sato ....................... B25J 9/1633 |
| 2018/0293768 | A1* | 10/2018 | Ooshima ................. G06T 19/00 |
| 2019/0054617 | A1* | 2/2019 | Huang ................... B25J 9/1697 |
| 2019/0358817 | A1* | 11/2019 | Ghazaei Ardakani ....................... B25J 13/025 |
| 2019/0361589 | A1* | 11/2019 | Yerli ....................... G06F 3/011 |
| 2020/0101610 | A1* | 4/2020 | Thackston ............. B25J 9/1612 |
| 2020/0122327 | A1* | 4/2020 | Hazan .................... B25J 9/1605 |
| 2021/0154826 | A1* | 5/2021 | Watanabe ................ B25J 19/04 |

FOREIGN PATENT DOCUMENTS

| | | | |
|---|---|---|---|
| WO | 2011107278 | A1 | 9/2011 |
| WO | WO-2011107278 | A1 * | 9/2011 ................ B25J 3/04 |

OTHER PUBLICATIONS

Hasunuma, Hitoshi, et al. "A tele-operated humanoid robot drives a backhoe." 2003 IEEE International Conference on Robotics and Automation (Cat. No. 03CH37422). Taipei, Taiwan. vol. 3 (2003): 2998-3004.

Hasunuma, Hitoshi, et al. "The Tele-operation of the Humanoid Robot-Whole Body Operation for Humanoid Robots in Contact with Environment—" 2006 6th IEEE-RAS International Conference on Humanoid Robots. Genova, Italy. (2006): 333-339.

* cited by examiner

ROBOTIC CONTROL VIA A VIRTUAL WORLD SIMULATION

CROSS-REFERENCE TO RELATED APPLICATIONS

This application claims the benefit of the filing date of U.S. provisional application No. 62/802,081, filed on 6 Feb. 2019, the teachings of which are incorporated herein by reference in their entirety.

BACKGROUND

Field of the Invention

The present disclosure relates to robotic systems. The present disclosure also relates to virtual reality (VR) and augmented reality (AR) systems.

Description of the Related Art

This section introduces aspects that may help facilitate a better understanding of the disclosure. Accordingly, the statements of this section are to be read in this light and are not to be understood as admissions about what is prior art or what is not prior art.

As the need for more-advanced robotic systems grows, and especially the need for systems that can collaborate with humans or operate in unsupervised environments, the flaws of existing control systems for robots have become evident. Most precision control systems require extensive programming and testing before they are suitable for unpredictable environments, while the robot control systems intended for unpredictable environments are often limited to simple tasks. This has resulted in a high development cost for robotic systems that are flexible or capable of handling variations beyond changes to timing or positioning. It has also led to a dearth of human-interactive robots and major shortcomings to the few robots that are considered human-safe.

Robots such as palletizing robots, to use an example of one of the most-frequent robotic uses, follow a strict routine that is programmed into the software, and they conduct that routine without variation or aberration. Other robots such as 6-axis welding robots and painting robots similarly follow strict pre-determined routines in their manufacturing roles. External systems, such as position sensors and laser gates, have been attached to these robots to allow the robots to delay an action if a package is not immediately ready, or to invoke alternative pre-programmed command sequences if certain variations are expected and planned. Some robot control systems include software tools such as inverse kinematics that aid the controller by specifying the desired positions of the robot at various moments of the routine, but these software tools are a component of the user's software suite, and the scope of the variation is limited. A change to production can require on-site reprogramming of the robots, and if the robot needs to determine the position of an object, then additional cameras and sensors are installed and the sensor software is integrated with the robotic system. If multiple robots operate within a shared area, then this complicates the task because the robots must coordinate in order to avoid interfering with each other.

Virtual reality (VR) environments are most commonly used for entertainment and gaming, although they are also employed in rehabilitative and professional contexts. A VR system includes a headset that is placed over the user's eyes, which tracks the position and rotation of the user's head, and contains a screen that presents an image to the user. Some VR systems include hand controllers that may be tracked in the environment. This allows the user to interact with the virtual environment. For example, in a game of virtual table tennis, the user is able to move around a virtual table by walking within a tracked area, and a virtual paddle can be attached to the hand controller. The player can swing the tracked hand controller to swing the virtual paddle and hit the table tennis ball. The virtual environment is visually and aurally convincing; however, an issue arises when the user tries to physically interact with an object or entity in the virtual world. The user may try to reach out and touch the ping pong table, only to find that their hand passes through it. This breaks the immersive experience, and severely limits the use of virtual reality.

SUMMARY

There exists a need for a system in which the position and movements of a physical robot correspond to those of a virtual entity in a virtual reality or augmented reality environment in real time to provide a tactile entity for the user and responsive controls for the robot.

The use of a robotic system that matches the movements of a virtual object or entity, including but not limited to an entity in a virtual reality (VR) environment, such that the position and movement of the physical and virtual object or entity correspond, meaning the robot can react to objects, forces, or other environmental interferences in both the physical and/or virtual environment. Implementation includes, but is not limited to, allowing a user to interact physically with the robotic system to manipulate the virtual object or entity, or conversely interact with the virtual object or entity to manipulate the physical robot.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Figure 1:
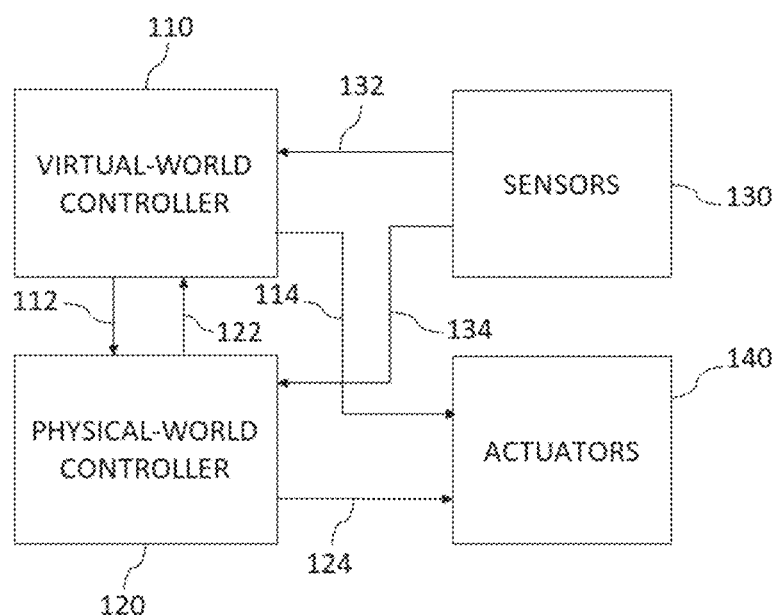
FIG. 1 is a block diagram of a robotic VR system according to certain embodiments of this disclosure.

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

As used herein, the term "real time" refers to the property of a system of low latency and/or timely usage of at least a portion of acquired data, rather than storage of that data for use at some unknown later time. Latency is an inherent part of data and power transmission, signal processing, computation, mechanical motions, and all other systems and is thus unavoidable. This definition incorporates near-real-time systems and interactive systems that operate with nominal time delays or with short delays that are necessitated by system functionality such as options for manual overrides or manual approvals, delays for confirmation from redundant systems, delays for additional sensor data and signal processing, delays due to computation and/or network communication, and other reasons. As such, a real-time system of the present disclosure (also referred to as an on-line system) may, for example, have a virtual-world (VW) controller that creates a simulated virtual environment having a virtual robot, instructs the virtual robot in the virtual environment, and then transmits those instructions to a physical-world (PW) controller that controls a physical robot with little or no delay. The interactions between the VW and PW controllers continue controlling both the virtual robot and the physical robot. On the other hand, a corresponding non-real-time system (also referred to as an off-line system) may have a VW controller that creates a simulated virtual environment having a virtual robot, instructs the virtual robot in the virtual environment, and then saves those instructions, for example, to a USB drive and copies those instructions to a PW controller that controls a physical robot. The VW controller is then turned off, and the PW controller indefinitely controls the physical robot based on those instructions.

As used herein, the terms "virtual reality" and "VR" refer to a computer-generated environment that a user can experience through sensory stimuli, such as sight and sound. As used herein, the terms "augmented reality" and "AR" refer to a computer-generated augmentation to the user's real environment which the user can experience through sensory stimuli such as sight and sound. As used herein, the terms "virtual world" and "VW" is used generically to referred to either or both of VR and AR.

A virtual world system and/or VW headset can be of any of multiple implementations. Some headsets, such as the original Oculus Rift headset from Facebook, Inc., of Menlo Park, Calif., use indicators on the headset and hand trackers that are observed by external sensors. The sensors send that tracking information to a computer that uses that information to determine the positions and rotations of the headset and the trackers. Other headsets, such as the HTC Vive headset from HTC Corporation of Taiwan, use 'lighthouse' towers that broadcast signals that are received by the headset and/or trackers, where timing and direction information from the signal receipt is used to reconstruct the positions and rotations of the headset and trackers. Other headsets, such as the Oculus Rift S headset from Facebook, Inc., and the Leap Motion headset from Leap Motion, Inc., of San Francisco, Calif., (i) use internal cameras within the headset to observe the environment and (ii) utilize Simultaneous Location And Mapping (SLAM) techniques to determine and track the position and orientation of the headset within that environment. Such headsets may also use those cameras to detect and track the user's hands or gaming controller that the user is holding in his/her hands. Some systems, such as the Microsoft Xbox Kinect system from Microsoft Corporation of Redmond, Wash., or the Leap Motion sensor from UltraLeap of San Francisco, Calif., may use cameras or other suitable motion capture systems to track the user. Some headsets, like the Samsung Gear VR headset from Samsung of South Korea, may use an internal compass and Inertial Measurement Unit and/or a gyroscope (or those sensors within a smartphone attached to the headset) to determine the orientation of the user's head and/or gaming controller. Some headsets may use a combination of these techniques to improve accuracy and responsiveness. Some headsets may incorporate all computation within the headset or attached accessories, whereas other headsets offload at least some computation to a separate device such as a personal computer or a video game system. Some headsets use a screen to display output to a user, whereas other headsets (i) may use an internal projector to project that visual information onto a surface or element in front of the user's eye or (ii) may use a projector to project onto the user's retina. Regardless of the particular implementation and hardware of any specific system, they are all forms of virtual reality, augmented reality, extended reality, and/or mixed reality. Embodiments of the present disclosure can be used with any such implementation even if specific embodiments are described herein with regard to a limited subset of such systems.

As used herein, the term "robot" refers to a device having a reprogrammable controller or artificial intelligence that controls actuators designed to produce kinematic output in the form of changeable, instructed motions. A robot could be of a cartesian, cylindrical, Selective Compliance Articulated Robot Arm (SCARA), delta, jointed arm, or any other suitable configuration. Although the following description relates to robotic VR systems, those skilled in the art will understand how to implement related robotic AR systems.

FIG. 1 is a block diagram of a robotic VR system 100 according to certain embodiments of this disclosure. As shown in FIG. 1, the system 100 comprises a virtual-world (VW) controller 110, a physical-world (PW) controller 120, one or more sensors 130, and one or more actuators 140. Depending on the particular implementation, (i) one or more of the sensors 130 generate and transmit sensor signals via link 132 to the VW controller 110 and/or (ii) one or more of the sensors 130 generate and transmit sensor signals via link 134 to the PW controller 120. In addition, depending on the particular implementation, (i) the VW controller 110 transmits control signals via link 114 to one or more of the actuators 140 and/or (ii) the PW controller 120 transmits control signals via link 124 to one or more of the actuators 140. In addition, depending on the particular implementation, (i) the VW controller 110 transmits signals via link 112 to the PW controller 120 and/or (ii) the PW controller 120 transmits signals via link 122 to the VW controller 110.

Depending on the particular implementation, the physical world may have one or more physical components that have corresponding virtual components in the virtual world. A PW component and its corresponding VW component may be said to be a pair of twins. A controller is a device and/or software that is used to monitor and/or control its twin. Thus, the PW controller monitors and/or controls one or more PW twins, while the VW controller monitors and/or controls one or more VW twins.

In some implementations, the VW controller 110 and the PW controller 120 are implemented as two distinct physical components of the system 100, such as two different computer processors, that communicate with one another over wired and/or wireless links 112 and/or 122. In other implementations, the VW controller 110 and the PW controller 120 are implemented in a single component of the system 100, such as inside a single computer, in which case the links 112 and 122 are internal to that single component.

Depending on the implementation, the sensors 130 of system 100 may include zero, one, or more transducers that generate electrical signals 132 representing physical attributes of the physical world that are used by the VW controller 110 to control the virtual world and/or to communicate to the PW controller 120. For example, a joystick used by an individual to control aspects of the virtual world is just one example of this type of sensor 130.

In addition, depending on the implementation, the sensors 130 of system 100 may include zero, one, or more transducers that generate electrical signals 134 representing physical attributes of the physical world that are used by the PW controller 120 to control the physical world and/or to communicate to the VW controller 110. A radar that tracks the motion of one or more physical objects in the physical world is just one example of this type of sensor 130.

Depending on the implementation, the actuators 140 of system 100 may include zero, one, or more transducers that convert electrical signals 114 corresponding to virtual aspects of the virtual world received from the VW controller 110 into physical phenomena that can be sensed by an individual. A VR headset that renders audio and video corresponding to the virtual world is just one example of this type of actuator 140.

In addition, depending on the implementation, the actuators 140 of system 100 may include zero, one, or more transducers that convert electrical signals 124 received from the PW controller 120 to move one or more physical objects in the physical world. A motor that moves a robot in space or moves a part of a robot relative to other parts of the robot is just one example of this type of actuator 140.

Depending on the implementation, the PW controller 120 may be a pre-existing component from an established supplier in the robotics industry and intended for usage with a different range of systems than those disclosed in this application. Examples of such pre-existing components include ABB robotic controllers from ABB Group of Zurich, Switzerland and Denso robotic controllers from Denso Corporation of Kariya, Aichi, Japan. If the PW controller 120 is a pre-existing component, then the particular hardware components, software, and mathematical formulas used therein may be proprietary information and might not be disclosed or directly accessible, and the hardware, software, and formulas may vary depending on the supplier and version of the PW controller 120. In such situations, the PW controller 120 will nonetheless have a Software Developer Kit (SDK), Application Programming Interface (API), or other communication tool or method that is accessible and disclosed and which allows use of the hardware and software through specified protocols.

Depending on the particular implementation, system 100 can operate in one or more of the following four different operating modes:

First operating mode: One or more physical twins monitored and/or controlled by the PW controller 120 are master twins; one or more corresponding virtual twins monitored and/or controlled by the VW controller 110 are slave twins; both the physical twin and the virtual twin respond to PW forces;

Second operating mode: One or more virtual twins monitored and/or controlled by the VW controller 110 are master twins; one or more corresponding physical twins monitored and/or controlled by the PW controller 120 are slave twins; both the physical twin and the virtual twin respond to VW forces;

Third operating mode: One or more virtual twins monitored and/or controlled by the VW controller 110 are master twins; one or more corresponding physical twins monitored and/or controlled by the PW controller 120 are slave twins; both the physical twin and the virtual twin respond to PW forces; and Fourth operating mode: One or more physical twins monitored and/or controlled by the PW controller 120 are master twins; one or more corresponding virtual twins monitored and/or controlled by the VW controller 110 are slave twins; both the physical twin and the virtual twin respond to VW forces.

Two controllers are said to be master and slave controllers, respectively, when the slave twin and its associated controller operate based on the results generated by the master twin and its associated controller. Thus, if the VW controller 110 generates the virtual world with a virtual twin based on effects (e.g., motion, detection of objects, etc.) of the corresponding physical twin in the physical world (whether or not those PW effects are generated by the PW controller 120), but not vice versa, then the PW controller 120 is a master controller and the VW controller 110 is a slave controller. On the other hand, if the PW controller 120 affects a physical twin based on the effects on the corresponding virtual twin in the virtual world as monitored by the VW controller 110, but not vice versa, then the VW controller 110 is a master controller and the PW controller 120 is a slave controller.

The term "force" refers to any interaction that results in a motion or pressure. Motion of physical objects in the physical world is caused by physical forces (aka PW forces). Analogously, motion of virtual objects in the virtual world may be said to be caused by virtual forces (aka VW forces), even if that motion has not been caused by a simulation of a physical force, as virtual objects can be instructed to move in ways that obviate physics simulation. When characteristics of the physical world (as detected by sensors 130) are used to control activity in both the physical world and the virtual world, then the physical world and the virtual world are said to respond to PW forces. Analogously, when characteristics of the virtual world (as determined by the VW controller 110) are used to control activity in both the physical world and the virtual world, then the physical world and the virtual world are said to respond to VW forces.

FIGS. 2A-2D provide high-level flow charts outlining the processes employed for the first through fourth operating modes, respectively. Specific implementation details will be described later in different embodiments.

Figure 2A:
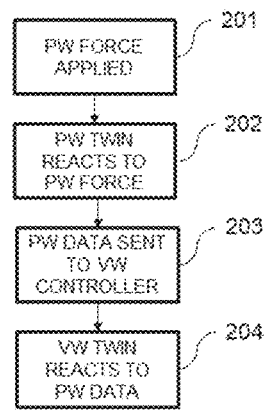
FIG. 2A represents processing in the first operating mode.

FIG. 2A represents processing in the first operating mode, where the physical twin is the master, the corresponding virtual twin is the slave, and both twins respond to PW forces. In step 201, physical force is applied to the physical twin either by the PW controller or by an independent PW effect. In step 202, the physical twin reacts to the physical force naturally as dictated by physics. In step 203, PW data (e.g., position and orientation of the physical twin) is sent to the VW controller. In step 204, the VW controller controls the virtual twin based on the PW data, for example, to match the position and orientation of the physical twin.

Figure 2B:
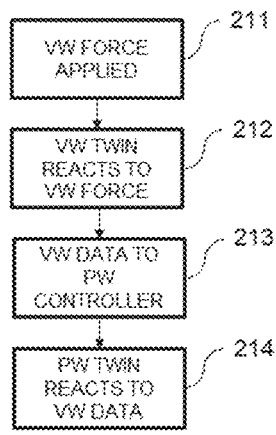
FIG. 2B represents processing in the second operating mode.

FIG. 2B represents processing in the second operating mode, where the virtual twin is the master, the corresponding physical twin is the slave, and both twins respond to VW forces. In step 211, virtual force is applied to the virtual twin by the VW controller. In step 212, the virtual twin reacts to the virtual force according to the virtual simulation of physics or however otherwise dictated to react by VW controller. In step 213, VW data (e.g., position and orientation of the virtual twin) is sent to the PW controller. In step 214, the PW controller controls the physical twin based on the VW data, for example, to match the position and orientation of the virtual twin.

Figure 2C:
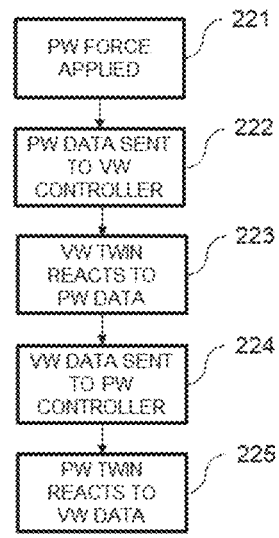
FIG. 2C represents processing in the third operating mode.

FIG. 2C represents processing in the third operating mode, where the virtual twin is the master, the corresponding physical twin is the slave, and both twins respond to PW forces. In step 221, physical force is applied to the physical twin by an independent PW effect. In step 222, PW data (e.g., magnitude and direction of the physical force) is collected by physical sensors and sent to the VW controller, which generates a verisimilitude of the physical force which may be adjusted to fit the specifications and limitations of the virtual environment. In step 223, the VW controller controls the virtual twin based on the virtual simulation of the PW force according to the virtual physics or other programming in the virtual environment. In step 224, VW data (e.g., position and orientation of the virtual twin) is sent to the PW controller. In step 225, the PW controller controls the physical twin based on the VW data, for example, to match the position and orientation of the virtual twin.

Figure 2D:
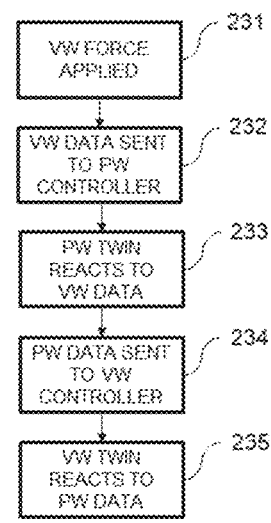
FIG. 2D represents processing in the fourth operating mode.

FIG. 2D represents processing in the fourth operating mode, where the physical twin is the master, the corresponding virtual twin is the slave, and both twins respond to VW forces. In step 231, virtual force is applied by the VW controller. In step 232, VW data (e.g., magnitude and direction of the virtual force) is sent to the PW controller. In step 233, the PW controller controls the physical twin based on the VW force. In step 234, PW data (e.g., position and orientation of the physical twin) is sent to the VW controller. In step 235, the VW controller controls the virtual twin based on the PW data, for example, to match the position and orientation of the physical twin.

First Operating Mode: The Physical Twin is the Master Twin; the Virtual Twin is the Slave Twin; Both the Physical Twin and the Virtual Twin Respond to PW Forces In the first operating mode, (i) the PW controller 120 monitors and/or controls the motion of one or more physical objects in the physical world (aka one or more PW objects) independent of the virtual world and (ii) the VW controller 110 controls the motion of one or more virtual objects in the virtual world (aka one or more VW objects) to correspond to the motion of the one or more PW objects in the physical world.

The PW controller 120 monitoring the motion of one or more PW objects in the physical world involves one or more sensors 130 sensing the motion of one or more PW objects in the physical world and transmitting corresponding sensor signals 134 to the PW controller 120. The PW controller 120 controlling the motion of one or more PW objects in the physical world involves the PW controller 120 generating and transmitting control signals 124 to one or more actuators 140 to cause those one or more actuators 140 to move the one or more PW objects in the physical world. In the first operating mode, the monitoring and/or controlling of the motion of the one or more PW objects in the physical world by the PW controller 120 occurs independent of whatever is happening in the virtual world.

The VW controller 110 controlling the motion of one or more VW objects in the virtual world to correspond to the motion of the one or more PW objects in the physical world involves the PW controller 120 transmitting signals 122 to the VW controller 110 that the VW controller 110 uses to control the motion of the one or more VW objects in the virtual world.

Thus, in the first operating mode, the PW controller 120 functions independent of the virtual world, and the VW controller 110 functions dependent on the physical world, where the virtual world is controlled by the VW controller 110 to correspond to the physical world.

As such, in the first operating mode, the PW controller 120 is a master controller, the VW controller 110 is a slave controller, and both the physical world and the virtual world respond to PW forces.

Second Operating Mode: The Virtual Twin is the Master Twin; the Physical Twin is the Slave Twin; Both the Physical Twin and the Virtual Twin Respond to VW Forces In the second operating mode, (i) the VW controller 110 monitors and/or controls the motion of one or more VW objects in the virtual world independent of the physical world and (ii) the PW controller 120 controls the motion of one or more PW objects in the physical world to correspond to the motion of the one or more VW objects in the virtual world.

The VW controller 110 monitoring and/or controlling the motion of one or more VW objects in the virtual world occur as inherent parts of the processing performed by the VW controller 110 to create the virtual world. In the second operating mode, the monitoring and/or controlling of the motion of the one or more VW objects in the virtual world by the VW controller 110 occurs independent of whatever is happening in the physical world.

The PW controller 120 controlling the motion of one or more PW objects in the physical world to correspond to the motion of the one or more VW objects in the virtual world involves the VW controller 110 transmitting signals 112 to the PW controller 120 that the PW controller 120 uses to generate control signals 124 for one or more actuators 140 to control the motion of the one or more PW objects in the physical world.

Thus, in the second operating mode, the VW controller 110 functions independent of the physical world, and the PW controller 120 functions dependent on the virtual world, where the physical world is controlled by the PW controller 120 to correspond to the virtual world.

As such, in the second operating mode, the VW controller 110 is a master controller, the PW controller 120 is a slave controller, and both the physical world and the virtual world respond to VW forces.

Third Operating Mode: The Virtual Twin is the Master Twin; the Physical Twin is the Slave Twin; Both the Physical Twin and the Virtual Twin Respond to PW Forces In the third operating mode, (i) the VW controller 110 controls the motion of one or more VW objects in the virtual world based on information received from one or more sensors 130 and/or the PW controller 120 and (ii) the PW controller 120 controls the motion of one or more PW objects in the physical world to correspond to the motion of the one or more VW objects in the virtual world.

The VW controller 110 controlling the motion of the one or more VW objects in the virtual world based on information received from one or more sensors 130 and/or the PW controller 120 involves (i) one or more sensors 130 transmitting a signal 134 to the PW controller 120, with the PW controller 120 transmitting signals 122 to the VW controller 110, (ii) zero or more sensors 130 transmitting signals 132 to the VW controller 110, and/or (iii) the VW controller 110 using those signals 122 and/or 132 to control the motion of the one or more VW objects in the virtual world.

The PW controller 120 controlling the motion of the one or more PW objects in the physical world to correspond to the motion of the one or more VW objects in the virtual world involves (i) the VW controller 110 transmitting signals 112 to the PW controller 120 and (ii) the PW controller 120 using those signals 112 to generate and transmit control signals 124 to one or more actuators 140 to control the motion of the one or more PW objects in the physical world.

Thus, in the third operating mode, the VW controller 110 functions dependent on the physical world, and the PW controller 120 functions dependent on the virtual world, where the physical world is controlled by the PW controller 120 to correspond to the virtual world.

As such, in the third operating mode, the VW controller 110 is a master controller, the PW controller 120 is a slave controller, and both the physical world and the virtual world respond to PW forces.

Fourth Operating Mode: The Physical Twin is the Master Twin; the Virtual Twin is the Slave Twin; Both the Physical Twin and the Virtual Twin Respond to VW Forces In the fourth operating mode, (i) the PW controller 120 controls the motion of one or more PW objects in the physical world based on information received from the VW controller 110 and (ii) the VW controller 110 controls the motion of one or more VW objects in the virtual world to correspond to the motion of the one or more PW objects in the physical world.

The PW controller 120 controlling the motion of the one or more PW objects in the physical world based on information received from the VW controller 110 involves (i) the VW controller 110 transmitting signals 112 to the PW controller 120 and (ii) the PW controller 120 using those signals 112 to generate and transmit control signals 124 to one or more actuators 140 to control the motion of the one or more PW objects in the physical world.

The VW controller 110 controlling the motion of the one or more VW objects in the virtual world to correspond to the motion of the one or more PW objects in the physical world involves (i) the PW controller 120 transmitting signals 122 to the VW controller 110 and (ii) the VW controller 110 using those signals 122 to control the motion of the one or more VW objects in the virtual world.

Thus, in the fourth operating mode, the PW controller 120 functions dependent on the virtual world, and the VW controller 110 functions dependent on the physical world, where the virtual world is controlled by the VW controller 110 to correspond to the physical world.

As such, in the fourth operating mode, the PW controller 120 is a master controller, the VW controller 110 is a slave controller, and both the physical world and the virtual world respond to VW forces.

Examples: First Operating Mode

Figure 3A:
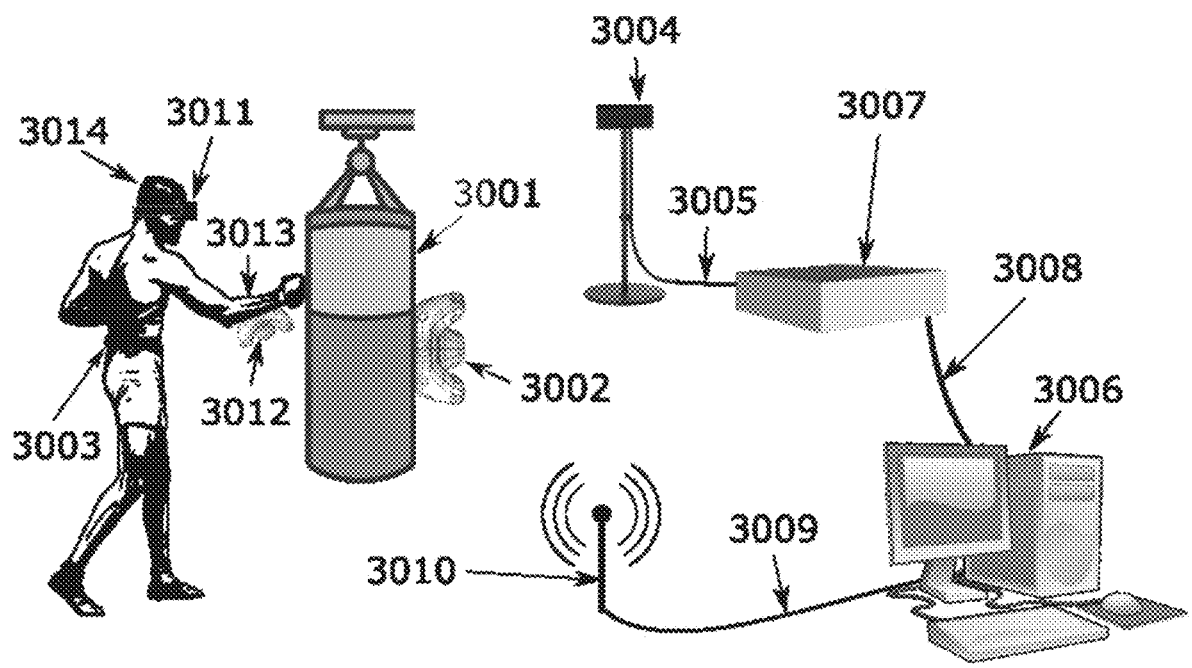
FIG. 3A depicts the physical-world components of an embodiment of the first operating mode.

FIG. 3A depicts the physical-world components of an embodiment of the first operating mode. In this particular embodiment, a user 3003, wearing an arm tracker 3012 on his arm 3013 and a VR headset 3011 on his head 3014, punches a punching bag 3001 that has an attached bag tracker 3002. The locations and orientations of the bag tracker 3002, arm tracker 3012, and VR headset 3011 are detected and tracked by a corresponding sensor 3004, and data representing the corresponding tracked locations and orientations are sent via a wired connection 3005 to a PW controller 3007 which interprets that data, and then sends the resulting interpreted data via a wired connection 3008 to a computer 3006 that hosts a virtual world. The computer 3006 processes that data and sends corresponding image data over a wired connection 3009 to the wireless broadcaster 3010, which wirelessly transmits that image data to the VR headset 3011, which displays corresponding imagery to the user 3003.

In some alternative embodiments, the VR headset 3011 may be attached directly to the computer 3006 via a wired connection. In some alternative embodiments, the broadcaster 3010 may be integrated in the computer 3006. In some alternative embodiments, the PW controller 3007 may be integrated in the computer 3006 as a hardware or software component. In some embodiments, the trackers 3002, 3012 may determine their positions and orientations based on signals broadcast by one or more broadcasters 3010 and/or sensors 3004, and transmit corresponding position and orientation information to the broadcasters 3010 and/or sensors 3004. In some embodiments, the positions and/or orientations of the punching bag 3001 and the user's arm 3013 and head 3014 may be computationally determined using data from one or more cameras (not shown) integrated into the VR headset 3011. See, e.g., U.S. Pat. No. 10,095,031, the teachings of which are incorporated herein by reference. In some alternative embodiments, the VR headset 3011 may be connected to the computer 3006 by a wired connection.

Figure 3B:
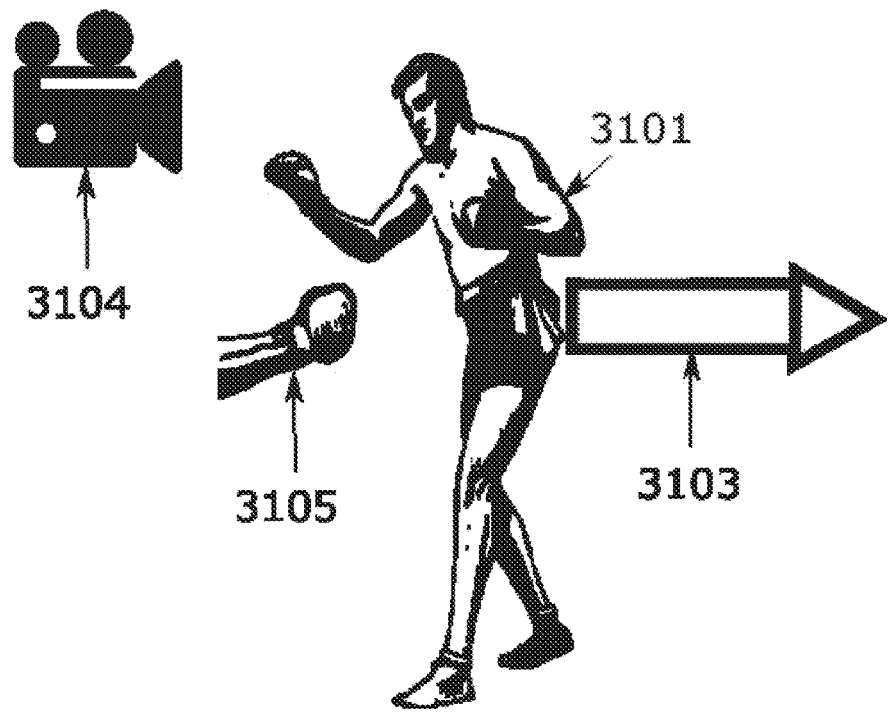
FIG. 3B depicts the virtual-world components that correspond to the PW embodiment of FIG. 3A.

FIG. 3B depicts the virtual-world components that correspond to the PW embodiment of FIG. 3A. The VW components include a virtual opponent 3101, a virtual arm 3105, and a virtual camera 3104. The virtual camera 3104 is generated by the computer 3006 of FIG. 3A and continuously updated to match the position and orientation of the user's head 3014 based on the tracking data of the VR headset 3011 from sensor 3004. Note that the image shown in FIG. 3B is not the image shown to the user 3003 via the VR headset 3011; it is instead a "3rd person" view from the side. As such, the virtual camera 3104 marks the location and orientation for the perspective of the user 3003. The virtual arm 3105 is generated and moved by the VW controller 3006 to match the position and orientation of the user's physical arm 3013 based on data from the tracker 3012.

The VW controller 3006 also generates the virtual opponent 3101 in place of the physical punching bag 3001 of FIG. 3A. The movement of the physical punching bag 3001 that is tracked by the tracker 3002 and sensor 3004 is replicated in the virtual world by a VW force or motion 3103 applied to generate movement 3103 of the virtual opponent 3101. The movements of the virtual opponent 3101 can be controlled or augmented by pre-scripted or procedurally generated animations that allow the virtual opponent 3101 to punch, block, dodge, or take other actions suitable for a boxing opponent. The movements of the user's arm 3013 are tracked by the tracker 3012 and replicated by the VW controller 3006 as the virtual arm 3105, which can include a visual and/or collider component. In entertainment simulations and video games, it is convention to utilize colliders which are 2D or 3D objects on which special physics-handling code like collision detection, momentum, friction, gravity, and other aspects are applied. This physics handling requires extensive calculations that increase exponentially with the number of colliders in an environment (since the physics handling tests for a collision between each collider and every other collider) and with the complexity of the shape of the colliders (since it is more difficult to test for collisions with a complex multi-faceted object than a simple one). Therefore, only a small selection of objects in an environment may have physics colliders, and those colliders are usually simplified forms of the object's shape, in order to reduce the computational requirements. Thus, a simulation may use a box-shaped collider for a first and a cylinder-shaped collider for a forearm, since this is more efficient than perfectly modeling each finger and the contours of the forearm. Sometimes, the colliders may be the visual objects (such as the animated opponent), but usually the colliders are differentiated to improve processing efficiency. Visual components are entities that have some visible element, e.g., animated characters, the floor and walls of a virtual room that a player is in, and anything else that is rendered for screen or display output. Interactions between the virtual arm 3105 and the virtual opponent 3101 can be monitored by the VW controller 3006 to trigger aforementioned scripts or reactions of the virtual opponent 3101.

Figure 3C:
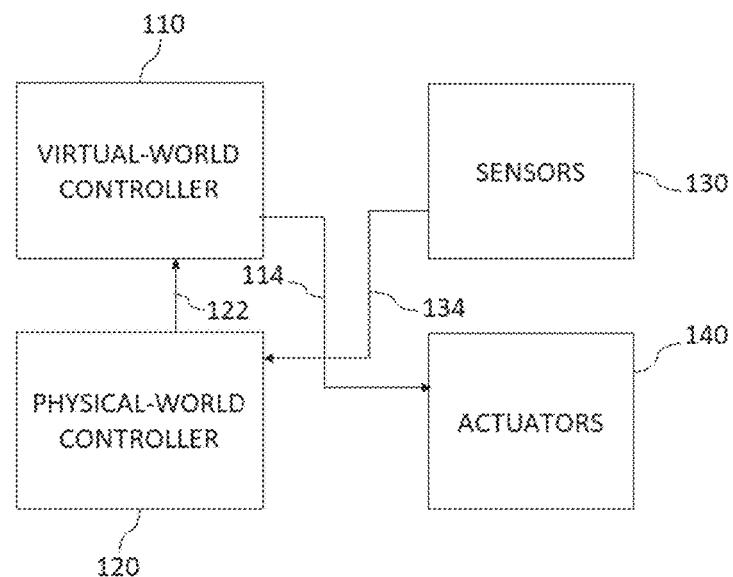
FIG. 3C depicts the portions of the robotic VR system of FIG. 1 that are used in the embodiment depicted in FIGS. 3A and 3B.

FIG. 3C depicts the portions of the robotic VR system 100 of FIG. 1 that are used in the embodiment depicted in FIGS. 3A and 3B. In FIG. 3C:

The VW controller 110 of FIGS. 1 and 3C corresponds to the computer 3006 of FIG. 3A;

The PW controller 120 of FIGS. 1 and 3C corresponds to the PW controller 3007 of FIG. 3A;

The sensors 130 of FIGS. 1 and 3C correspond to the sensor 3004 of FIG. 3A;

The actuators 140 of FIGS. 1 and 3C correspond to the audio and video rendering components (not shown) in the VR headset 3011 of FIG. 3A;

The link 134 of FIGS. 1 and 3C corresponds to the data paths from the trackers 3002, 3012, the VR headset 3011, and the sensors 3004 of FIG. 3A to the PW controller 3007, including the wired connection 3005;

The link 122 of FIGS. 1 and 3C corresponds to the connection 3008 of FIG. 3A; and The link 114 of FIGS. 1 and 3C corresponds to the data path from the computer 3006 and broadcaster 3010 to the VR headset 3011, including the wired connection 3009.

For the embodiment of FIGS. 3A-3C, the VW controller 110 (i.e., the computer 3006) generates the virtual world (i.e., the virtual opponent 3101, the virtual arm 3105, and the virtual camera 3104 of FIG. 3B) based on effects in and observations of the physical world (i.e., the PW motions of the punching bag 3001 and the user's arm 3013 and head 3014 of FIG. 3A). As such, for this embodiment, the PW controller 120 (i.e., the PW controller 3007) is the master controller, and the VW controller 110 (i.e., the computer 3006) is the slave controller. Furthermore, in this embodiment, characteristics of the physical world (i.e., the PW motions of the user's arm 3013 and head 3014 and of the punching bag 3001) are used to control activity in the virtual world (i.e., VW motion of the virtual opponent 3101, the virtual arm 3105, and the virtual camera 3104). As such, in this embodiment, the physical world and the virtual world both respond to PW forces. Since the PW controller 120 is a master controller, the VW controller 110 is a slave controller, and both the physical and virtual worlds respond to PW forces, this embodiment is an example of the first operating mode.

Figure 4:
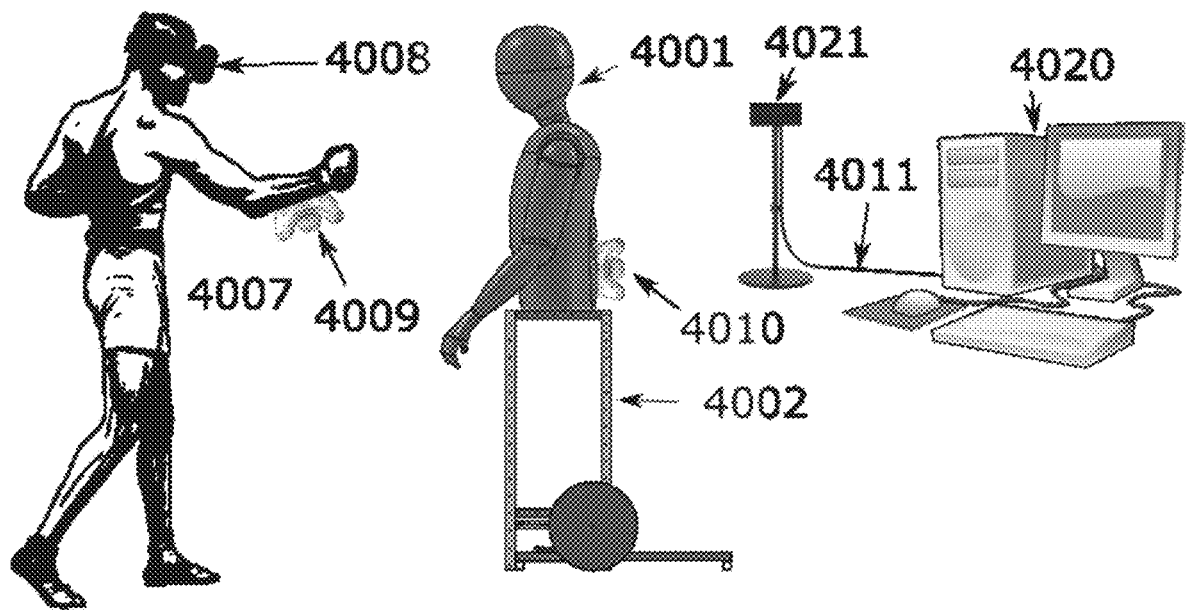
FIG. 4 provides a view of the physical components of another embodiment of the first operating mode.

FIG. 4 provides a view of the physical components of another embodiment of the first operating mode where a user 4007 wears a VR headset 4008 on his head and a tracker 4009 on his arm, where the tracker 4009 is tracked by sensor 4021. An opponent 4001 is mounted to a robot base 4002 that is controlled by electronic components (not shown) integrated into the base 4002. The electronic components can send and receive wireless command signals to and from a computer 4020, which, in some embodiments, can be integrated with the robot 4002 or the VR device 4008, but, in this embodiment, is depicted as a discrete device. The opponent 4001 has an attached tracker 4010, which is also tracked by sensor 4021. The sensor 4021 communicates with the computer 4020 via a wired connection 4011. In this particular embodiment, the sensor 4021 is a discrete device, but, in other implementations, could be integrated into the VR device 4008, the robot base 4002, or the opponent 4001. The computer 4020 hosts the virtual world and sends corresponding image data over a wireless connection to the VR headset 4008, which displays corresponding imagery to the user 4007. The mobile base 4002 is powered via internal batteries (not shown) and traverses small distances according to saved, internal instructions in order to resemble the movement of a real opponent. Because the opponent 4001 is tracked via tracker 4010 and sensor 4021, this movement is shown in the virtual world to the user 4007 via the headset 4008.

Examples: Second Operating Mode

Figure 5A:
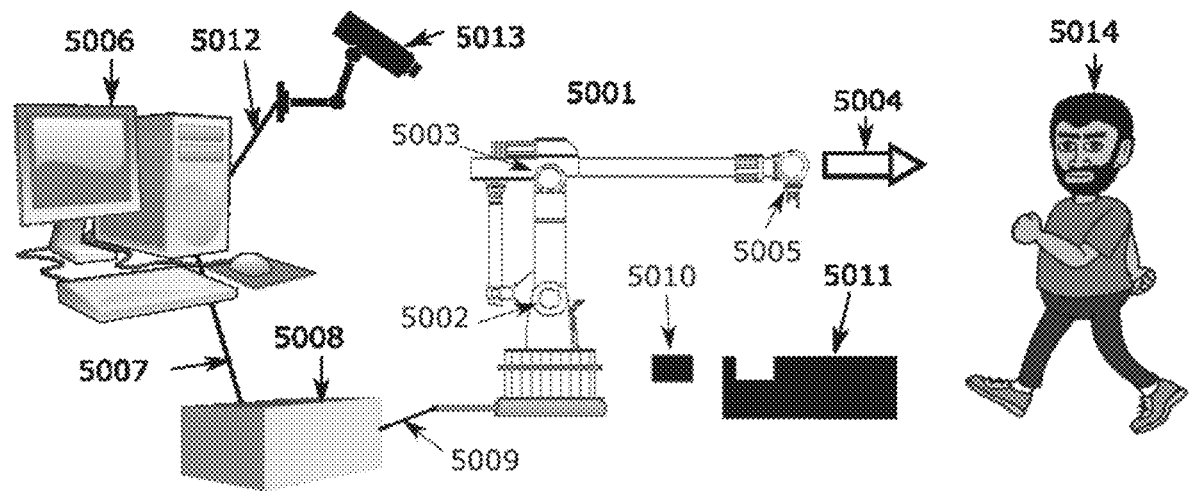
FIG. 5A depicts the physical-world components of an embodiment that utilizes the second operating mode.

FIG. 5A depicts the physical-world components of an embodiment that utilizes the second operating mode. In this particular embodiment, a physical-world controller 5008 instructs a robot arm 5001 to rotate at axes 5002 and 5003 to move the end effector 5005 forward 5004. This particular embodiment depicts a robot arm with only two axes, but the principles can be applied to other robot arm/end effector configurations with three or more axes (not shown) and the associated kinematics and movement profiles of such configurations. Axes 5002 and 5003 each contain an actuator (e.g., a motor, not shown) and a sensor (not shown) that are respectively used to create and monitor rotational motion of the axis. Angle data from axes 5002 and 5003 are sent via a wired connection 5009 to the PW controller 5008, which uses that information in a proportional-integral-derivative (PID) or other control function to generate and transmit instructions via the connection 5008 to control the movements of the motors in the robot arm 5001. The PW controller may also send that information, or the result of some calculation using that information, or other robot or PW controller status information, via a wired connection 5007 to a computer 5006 which functions as a VW controller. The VW controller may utilize that information in its virtual world, and may transmit commands via connection 5007 back to the PW controller 5008.

In some embodiments, the PW controller 5008 can instruct the arm 5001 to pick up a component 5010 with the end effector 5005 and insert the component 5010 into an assembly 5011. In other embodiments, the end effector 5005 may be a camera or sensor that is used to inspect components rather than manipulate or interact with them. In some embodiments, one or more sensors 5013, such as (without limitation) visible light cameras, infrared cameras, Time-of-Flight cameras, structured light cameras, depth sensors, or other suitable sensing systems are attached to the computer 5006 via a physical, wired connection 5012. In some alternative embodiments, such sensor(s) 5013 may instead be connected to the computer 5006 via the PW controller 5008.

In the particular embodiment of FIG. 5A, a camera 5013 is configured to sense humans to enable the robot arm 5001 to be controlled to stop moving if a person 5014 approaches too close and violates a safety requirement. In this particular embodiment, the computer 5006 analyzes the data from the camera 5013 with software such as the Open Source Computer Vision library from the OpenCV team, the Azure Kinect Body Tracking SDK from Microsoft of Redmond, Wash., Nuitrack Full Body Skeletal Tracking Software from Nuitrack of Walnut, Calif., or similar software to detect the person 5014 in the depth frame from the camera. In other embodiments, that calculation and analysis can be done on hardware attached to or embedded in the camera 5013, on the PW controller 5008, or on another device (not shown).

Depending on the particular implementation, the signals from the axis sensors may be (i) used directly by the corresponding axis motor and/or (ii) sent to the PW controller 5008 for processing. In some implementations, each axis sensor is a rotary encoder mounted on the motor axis. In some implementations, the axis sensor signals will be utilized in a microcontroller circuit at the axis motor. Such close integration improves the responsiveness of the motor. In some implementations, in addition or instead, the axis sensor signals are transmitted to the PW controller 5008 via the connection 5009. Toy hobby servos are examples of motorized axes where the axis sensor signals are used only within the axis servo motor. Adult enthusiast do-it-yourself (DIY) motors and servos are examples of motorized axes where the axis sensor signals are transmitted only to a remote motor controller. Modern industrial robotic servos are examples of motorized axes that do both. Some motor controller systems may forgo an axis sensor and instead estimate the current angle by recording a known reference position and tracking the amount that the motor has been instructed to deviate from this position. This is common with non-servo stepper motors.

Rotary encoders are just one possible type of sensor that can be used to track the motion of a robotic system, such as the robot arm 5001 of FIG. 5A. Those skilled in the art will understand that sensors such as (without limitation) digital compasses, accelerometers, and gyroscopes placed on robotic components (e.g., limbs) can be used to track the relative movements of those components. Cameras and image-processing systems can also be used to track movements.

In some embodiments, the PW controller 5008 can send the axis sensor data or other data about the robot 5001 or the PW controller 5008 status via the connection 5007 to the computer 5006, which may use this information for status checking, data logging, safety checks, or other purposes.

Figure 5B:
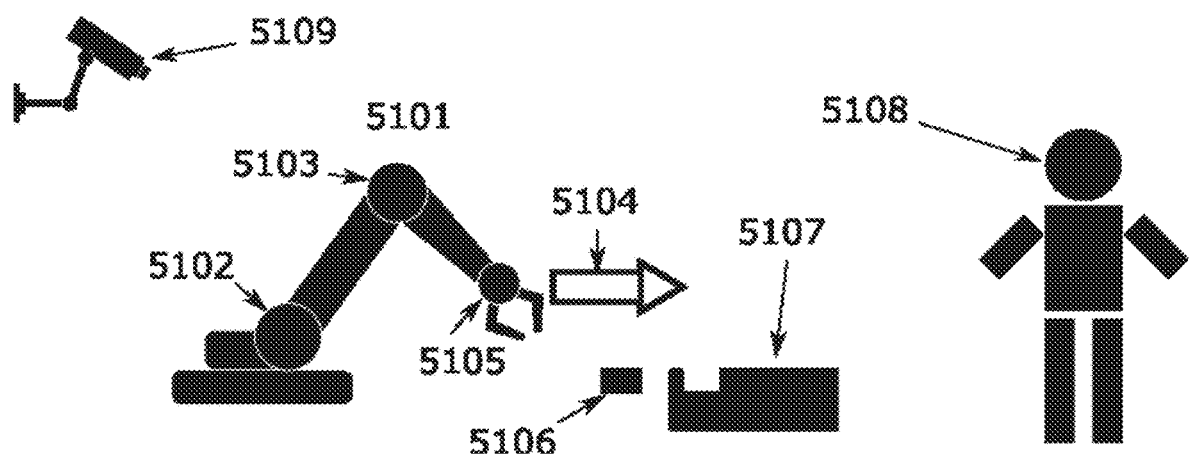
FIG. 5B depicts the virtual-world components that correspond to the PW embodiment of FIG. 5A.

FIG. 5B depicts the virtual-world components that correspond to the PW embodiment of FIG. 5A. The VW components include a virtual robot arm 5101, a virtual component 5106, a virtual assembly 5107, a virtual person 5108, and a virtual camera 5109, which correspond respectively to the PW robot arm 5001, the PW component 5010, the PW assembly 5011, the PW person 5014, and the PW camera 5013 of FIG. 5A. The virtual robot arm 5101 includes virtual axes 5102 and 5103 and a virtual end effector 5105 that correspond to the PW axes 5002 and 5003 and the PW end effector 5005, respectfully, of the PW robot arm 5001 of FIG. 5A.

The virtual end effector 5105 moves forward 5104 in the virtual world as instructed by a programmed movement routine. Such a movement routine may contain a list of positions that the virtual robot arm 5101 iterates through, may contain a sequence of motions, or may be generated in real-time in accordance with an algorithm that may use additional information from the virtual world, or the movement routine may be implemented with other methods. The rotations of the virtual axes 5102 and 5103 and the resulting movement 5104 of the virtual end effector 5105 are monitored and measured by the virtual-world controller (i.e., computer 5006). The computer 5006 generates instructions from this data by generating a desired orientation for each virtual axis 5102, 5103 of the virtual robot arm 5101 or a desired position and/or orientation for the virtual end effector 5105. This can be done with the mathematics of inverse kinematics, inverse dynamics, forward kinematics, or other formulations or a software package which encapsulates those functions, or with basic trigonometric and geometric functions. The mathematics involved include those covered in the textbook *Robot Modeling and Control* by Spong, Hutchinson, and Vidyasagar (John Wiley & Sons, Inc., 2006).

The computer 5006 then compares the desired VW arm position or axis orientation(s) to the detected PW arm position or axis orientation(s). The computer 5006 can use any of several comparison methods to determine the required output, depending on the specifications in the simulation. These methods can include, but are not limited to, finding the angular difference between each virtual joint 5102, 5103 of the virtual robot arm 5101 and the corresponding PW joint 5002, 5003 of the physical robot arm

5001 and commanding the PW controller 5008 to move the PW joints 5002, 5003 by those differences; finding the displacement between the current position of the PW end effector 5005 and its desired VW position 5105 and instructing the PW controller 5008 to move the PW end effector 5005 by that displacement; and determining the velocity of the PW end effector 5005 and the velocity of the virtual end effector 5105 and instructing the PW controller 5008 to accelerate the PW end effector 5005 to match the velocity of the virtual end effector 5105.

The movement type can be in whatever form the PW controller 5008 accepts, including but not limited to a halt, an instruction for a relative angular movement of each PW axis 5002, 5003, an absolute angle destination for each PW axis 5002, 5003, a relative movement of the PW end effector 5005, an absolute destination for the PW end effector 5005, velocities for any PW axis 5002, 5003 or the PW end effector 5005, torque for any PW axis 5002, 5003 or the PW end effector 5005, or other instructions and parameters that are known by one skilled in the art of robotic control or which are documented in the manual for the PW controller 5008. Such commands may also include parameters for iteration to the next instruction, deceleration upon approaching the destination, torque limitations, special approach vectors (commonly used to mitigate mechanical imprecision or 'slop' in gears), and other specifications allowed by the PW controller 5008.

In the particular embodiment of FIGS. 5A and 5B, if using a Denso 6-axis robot arm with the RC8 Robot Controller and communicating via the b-Cap communication protocol in the computer language C#, such an instruction may be: caoRobot.Execute("DriveAEx", new object[ ] {"@0 (1, 10), (2, −10)", "S=10, NEXT" }); which instructs the robot controller 5008 to rotate the first axis 5002 of the PW robot arm 5001 by 10 degrees and the second axis 5003 by −10 degrees. This particular embodiment has additional movement modes that utilize additional commands, and thus may also send an instruction such as: caoRobot.Move(1, "P(400, 300, 200, 180, 0, 180, 5)", "NEXT"). This command instructs the robot controller 5008 to utilize the Move protocol with interpolation option #1 to move the PW end effector 5005 to the (X,Y,Z) coordinates (400 mm, 300 mm, 200 mm) (where "mm" denotes millimeters, and the position is relative to the center of the base of the robot arm 5001) and rotate the PW end effector 5005 to the (Rx, Ry, Rz) orientation (180, 0, 180). This command also instructs the PW controller 5008 to accept the next instruction or line of code while the robot 5001 is conducting this movement. Additional commands available in this particular embodiment are in the reference manual "RC8 Provider User's Guide, version 1.1.4 (Sep. 18, 2018), by DENSO WAVE Inc, a subsidiary of Denso Corporation of Kariya, Aichi, Japan. Commands available in another embodiment that uses an ABB 6-axis robot arm and ABB's IRC5 controller are in the reference manual "Technical reference manual, RAPID Instructions, Functions, and Data types. RobotWare 5.13. Document ID: 3HAC 16581-1" (ABB AB, 2004) by ABB Group of Zurich, Switzerland. These commands are sent from the computer 5006 via the connection 5007 to the PW controller 5008, which then instructs the physical robot arm 5001 via the connection 5009 to make the corresponding movements.

In some embodiments, the virtual world contains the virtual component 5106 that the VW robot arm 5101 is to insert into the virtual assembly 5107, where the movement routine may include coordinates or movements that are relative to the VW component 5106 or VW assembly 5107, although the virtual world does not necessarily need to include this VW component 5106 or VW assembly 5107 in order for the program to control the VW robot arm 5101.

In some embodiments, the virtual world also includes the virtual camera 5109 which is located and oriented relative to the virtual robot arm 5101 just as the PW camera 5013 is located and oriented relative to the PW robot arm 5001. Because the computer 5006 knows the position, orientation, and optical properties of the PW camera 5013 and replicates them into the virtual world upon the virtual camera 5109, the computer 5006 generates the virtual person 5108 based on the PW person 5014 who was sensed via the PW camera 5013. For example, if the PW camera 5013 senses that the PW person 5014 is 5 feet in front of and 10 degrees to the right of the PW camera 5013, then the computer 5006 can generate the virtual person 5108 to be 5 feet in front of and 10 degrees to the right of the virtual camera 5109. By projecting the same data that it was receiving, or by projecting a calculated result of that data, the computer 5006 ensures that the virtual person 5108 is at the same relative location as the PW person 5014.

The matching positions and orientations of the PW camera 5013 and virtual camera 5109 are used as a convenience in this particular embodiment. In other embodiments, the virtual camera 5109 does not need to be in such a position, or it may be excluded entirely and the virtual person 5108 can be instantiated at a location determined by mathematical calculations and transformations that may use reference points—which may include the (X=0, Y=0, Z=0) origin point, the installation location of the PW robot arm 5001, the location of the PW end effector 5005, the location of the PW camera 5013, and/or a location calculated based on placement of multiple cameras, sensors, detection markers, or other knowledge of either the physical or virtual world. Some embodiments may include multiple cameras 5013 at varying locations and orientations to provide redundancy, an expanded field of view, or detection around obstacles. Such embodiments with multiple cameras may also include additional computers (5006) or data-relaying devices that handle some of the data processing from the cameras 5013 and/or transmit data to the computer 5006 that hosts the virtual world.

In some embodiments, the computer 5006 calculates the distance between each detected limb of the virtual person 5108 and each part of the virtual robot arm 5101, and, if any part of the virtual person 5108 is within 1 meter of the virtual robot arm 5101, then the computer 5006 sends a Halt signal to the PW controller 5008 via connection 5007. In this particular instance, the C# code that sends that Halt command via the b-Caps protocol is: caoRobot.Halt(" "). The PW controller 5008 then halts the PW robot arm 5001 via whatever suitable mechanism is available, which can include (without limitation) mechanical brakes, electrical cutoffs, regenerative braking, and/or dynamic braking. When the PW person 5014 moves away from the PW robot arm 5001, the PW camera 5013 tracks this movement, which the computer 5006 replicates by moving the virtual person 5108 away from the virtual robot arm 5101, and then the computer 5006 instructs the PW controller 5008 to resume movement of the PW robot arm 5001.

In some embodiments, an operator may take control of the virtual robot arm 5101 or the virtual end effector 5105 by instructing its movement with keyboard, mouse, or other user interface methods, and thereby also control the physical robot arm 5001.

In some embodiments, the system may contain more than one instance of robot 5001 and more than one instance of virtual robot 5101. The system may also contain more than one instance of the PW controller 5008 and the connections 5007 and 5009, accordingly. In such an embodiment, the VW controller 5006 may monitor the multiple virtual robots 5101 and detect for collisions by checking for overlaps of colliders attached to the virtual robot(s) 5101. If such a collision is detected or predicted, then the VW controller 5006 may send a halt or alternative movement command to one or more of the PW controllers 5008 via connection 5007 in order to prevent a collision of physical robots 5001.

Figure 5C:
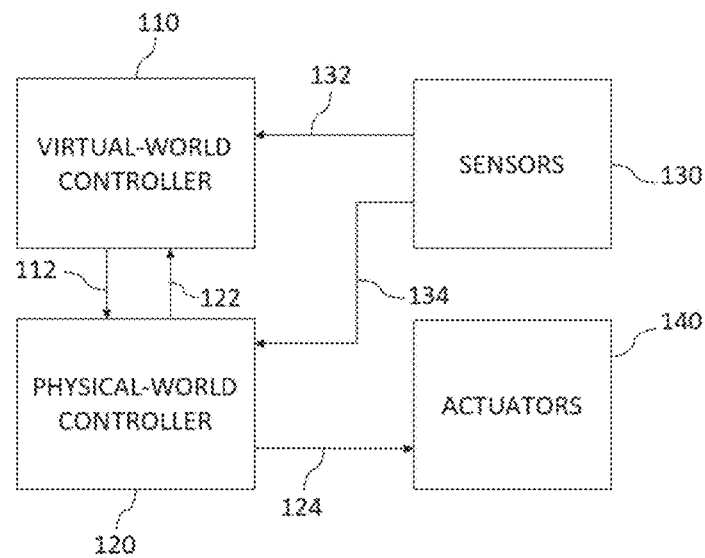
FIG. 5C depicts the portions of the robotic VR system of FIG. 1 that are used in the embodiment depicted in FIGS. 5A and 5B.

FIG. 5C depicts the portions of the robotic VR system 100 of FIG. 1 that are used in the embodiment depicted in FIGS. 5A and 5B. In FIG. 5C:

The VW controller 110 of FIGS. 1 and 5C corresponds to the computer 5006 of FIG. 5A;

The PW controller 120 of FIGS. 1 and 5C corresponds to the PW controller 5008 of FIG. 5A;

The sensors 130 of FIGS. 1 and 5C correspond to the sensors (not shown) in the PW axes 5002 and 5003 and the PW camera 5013 of FIG. 5A;

The actuators 140 of FIGS. 1 and 5C correspond to the motors (not shown) in the PW axes 5002 and 5003 and the PW end effector 5005 of FIG. 5A;

The link 132 of FIGS. 1 and 5C corresponds to the connection 5012 from the PW camera 5013 to the computer 5006 of FIG. 5A;

The link 134 of FIGS. 1 and 5C corresponds to the data paths, including the wired connection 5009, from the sensors in the PW axes 5002 and 5003 to the PW controller 5008 of FIG. 5A;

The links 112 and 122 of FIGS. 1 and 5C correspond to the connection 5007 of FIG. 5A; and The link 124 of FIGS. 1 and 5C corresponds to the data paths, including the wired connection 5009, from the PW controller 5008 to the motors in the PW axes 5002 and 5003 and the PW end effector 5005 of FIG. 5A.

For the embodiment of FIGS. 5A-5C, the PW controller 120 (i.e., the PW controller 5008) generates effects in the physical world (i.e., rotations of the PW axes 5002 and 5003 of FIG. 5A) based on effects in the virtual world (i.e., the motions of the VW robot arm 5101 and the VW person 5108 of FIG. 5B). As such, for this embodiment, the VW controller 110 (i.e., the computer 5006) is the master controller, and the PW controller 120 (i.e., the PW controller 5008) is the slave controller. Furthermore, in this embodiment, characteristics of the virtual world (i.e., the motions of the VW robot arm 5101 and the VW person 5108) are used to control activity in both the physical world (i.e., rotation of the PW axes 5002 and 5003) and the virtual world (i.e., motion of the virtual robot arm 5101 and the virtual person 5108). As such, in this embodiment, the physical world and the virtual world both respond to VW forces. Since the VW controller 110 is a master controller, the PW controller 120 is a slave controller, and both the physical and virtual worlds respond to VW forces, this embodiment is an example of the second operating mode.

Figure 5D:
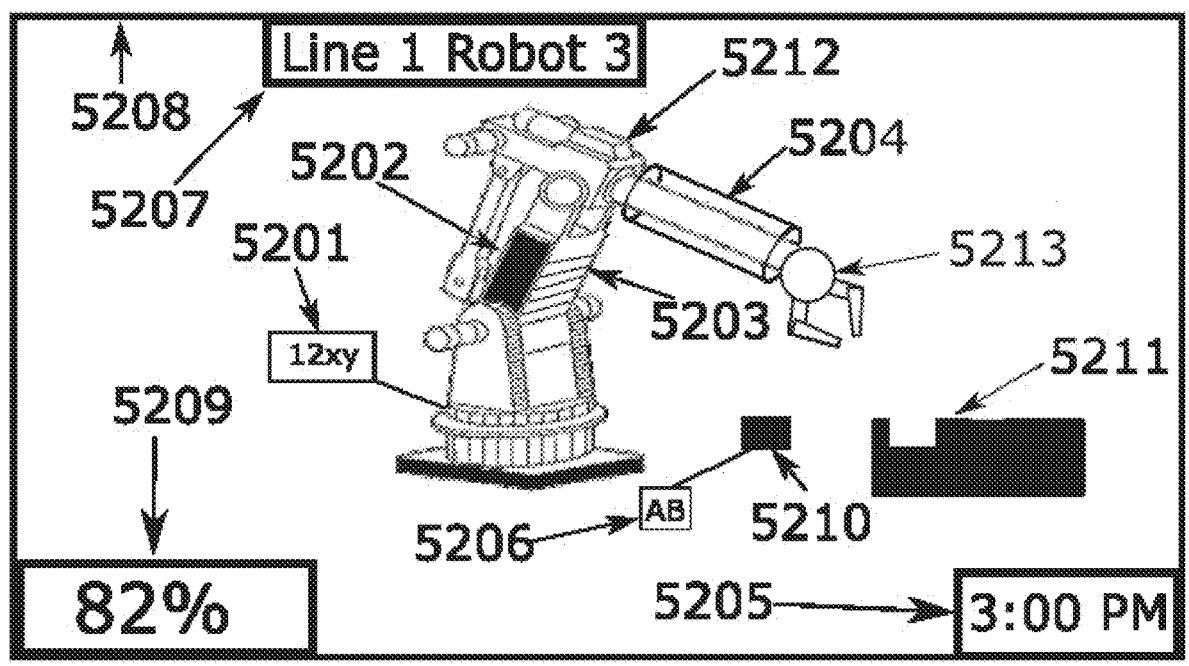
FIG. 5D depicts a virtual world that corresponds to the PW embodiment of FIG. 5A.

FIG. 5D depicts a virtual world as viewed in a heads-up-display (HUD) overlay 5208 by a user wearing an augmented reality (AR) headset, such as the HoloLens headset from Microsoft Corporation of Redmond, Wash., that corresponds to the PW embodiment of FIG. 5A. The HUD overlay 5208 can include information 5205 from the physical world, information 5207 about the virtual entities the user is viewing, and/or a compilation 5209 of virtual- and physical-world information such as the percentage of production completion of the assembly 5011 of FIG. 5A. Information annotations 5201 may be displayed to name or describe the virtual twin robot 5212, and highlights 5202 or indicators 5203 may be attached to the virtual twin 5212, or overlays 5204 can be displayed around the virtual twin 5212. The data used to make these augmentations can include temperature, torque, power consumption, maintenance alerts, or any other information tracked by the PW controller 5008 of FIG. 5A or which is available to the computer 5006 of FIG. 5A. If the scene is viewed via an AR headset that uses a transparent display or uses camera pass-through (a technique by which the headset screen shows the video feed from cameras that are embedded in the headset, thus allowing the view of the physical world to "pass through" the headset), the virtual twin 5212 may be rendered invisible so that these augmentations appear overlain upon the physical robot 5001 of FIG. 5A rather than upon the virtual robot 5212. The data or visualizations may be in the form of text, annotations, graphs, charts, highlights, overlays, illustrations, images, animations, motion images or video, or other suitable visual methods. The data used for these overlays may be obtained from the PW controller 5008, stored locally in the computer 5006 that hosts the virtual environment, or may be provided by external databases or data services (not shown). Non-robot entities in the physical or virtual environment, such as the physical assembly 5011 or virtual model 5211 of that assembly, can have annotations 5206 or augmentations.

Figure 6A:
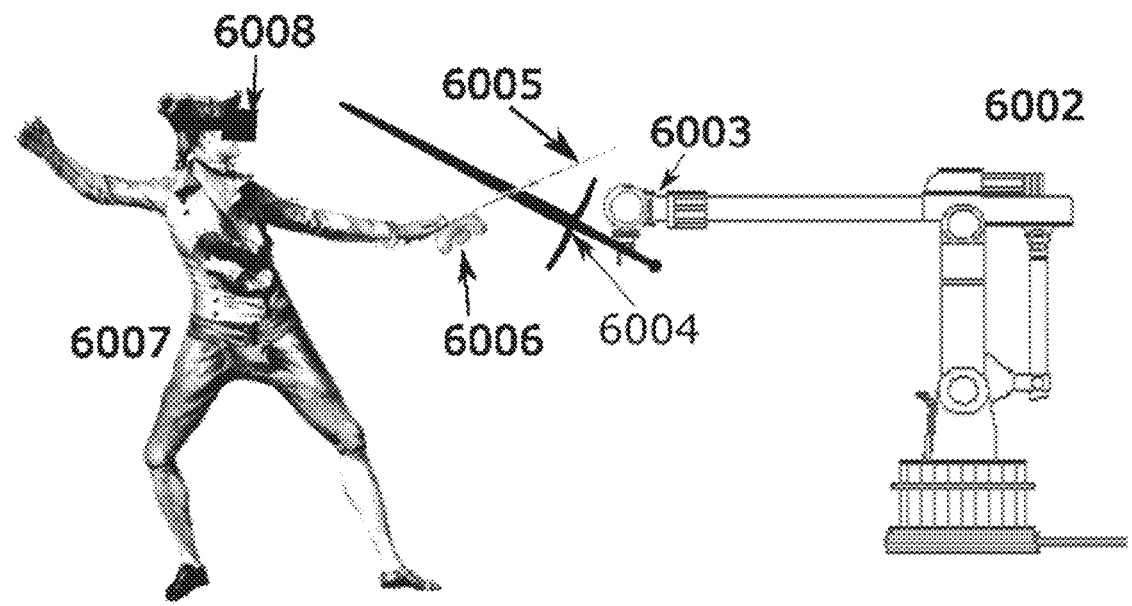
FIG. 6A depicts the physical components of another embodiment that utilizes the second operating mode.

FIG. 6A depicts the physical components of another embodiment that utilizes the second operating mode where a user 6007 wears a VR headset 6008 on his head and holds a sword 6005 that has an attached tracker 6006. The headset 6008 and tracker 6006 are tracked by a sensor (not shown) that is connected to a computer (not shown) that implements a VW controller, and the VR headset 6008 receives visual information via a broadcaster (not shown) attached to that computer, similar to FIG. 3A. An opponent robot 6002 wields a sword 6004 which is held by an end effector 6003. The robot may include multiple axes (not shown) and is attached to the PW controller which is attached to the computer, similar to FIG. 5A.

Figure 6B:
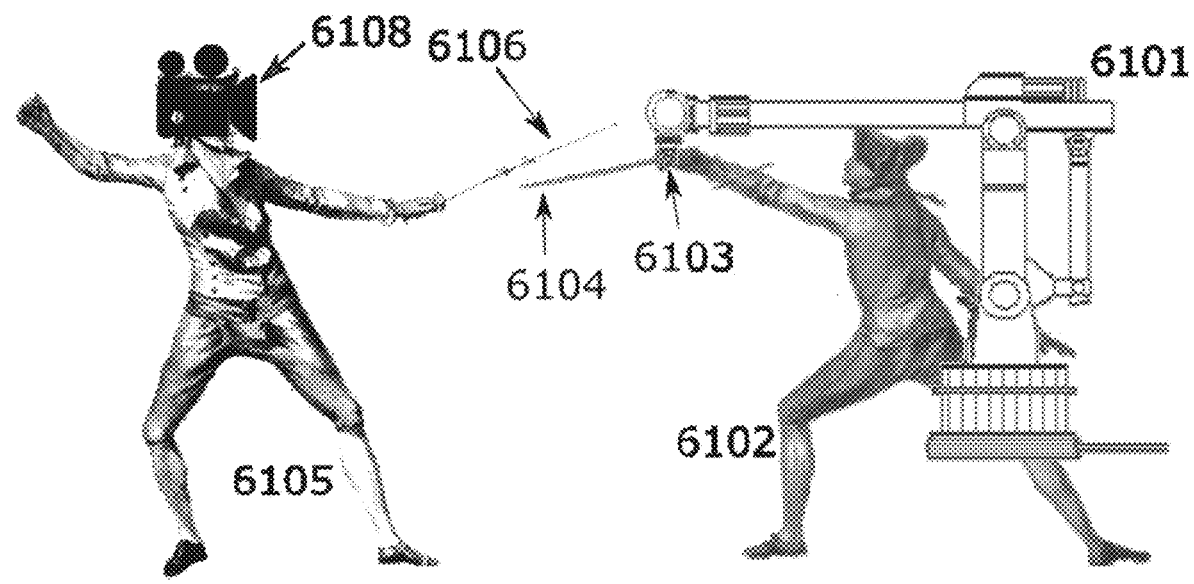
FIG. 6B depicts the virtual-world components that correspond to the embodiment of FIG. 6A.

FIG. 6B depicts the virtual-world components that correspond to the embodiment of FIG. 6A. The virtual world includes a virtual player 6105 and a virtual camera 6108 that is moved in the virtual world to match the position and orientation of the VR headset 6008 of FIG. 6A, and this camera's view is shown to the user 6007 via the VR headset 6008. The virtual world also includes a virtual sword 6106 that is moved in the virtual world to match the position and orientation of user's physical sword 6005 as tracked by the tracker 6006. The virtual world includes a virtual opponent 6102 that is holding a virtual sword 6104 in his hand 6103. The virtual world also includes a virtual robot 6101 which matches the movements and positions of the physical robot 6002, but the virtual robot 6101 is not rendered as a visual object in the virtual world and thus is invisible to the virtual camera 6108 and is therefore not displayed on the VR headset 6008 to the user 6007. The virtual robot 6101 is the virtual twin of the physical robot 6002 of FIG. 6A. The VW controller uses the actions of the virtual player 6105 to instruct the virtual opponent 6102 to execute swordfight animations that are appropriate responses to the virtual player's movements. For example, if the virtual player 6105 raises his virtual sword 6106 and prepares to swing it downwards, then the VW controller will trigger an animation in which the virtual opponent 6102 raises his virtual hand 6103 and his virtual sword 6104 in a direction perpendicular to the virtual sword 6106 of the virtual player 6105, thus forming a block for an impending slash or strike.

If the virtual player 6105 holds his virtual sword 6106 in a blocking position that is too far to the virtual player's left, the VW controller will trigger an animation in which the virtual opponent 6102 performs a jab with his virtual sword 6104 towards the player's undefended right side. During these motions, the virtual robot 6101 matches the virtual end effector (not shown) to the position and rotation of the opponent's virtual hand 6103. The VW controller (not shown) sends the axis angles of the virtual robot 6101 to the PW controller, which instructs the physical robot 6002 to match those angles. This causes the physical robot 6002 to move its end effector 6003 in the same manner as the virtual hand 6103 of the virtual opponent 6102, and thus also move the physical sword 6004 to match the virtual sword 6104. The VW controller can attach a virtual physics collider to the virtual swords 6104 and 6106, and use virtual physics simulation to ensure the swords can clash and deflect but not pass through each other. The VW controller can augment the virtual opponent 6102 animations, by using blend trees, ragdoll physics, or other tools, to better match the virtual opponent 6102 movements to the collision limits of the virtual sword 6104—so the limb movements will follow the limitations applied to the virtual sword 6104, rather than continue the animation and dislocate the virtual opponent's 6102 hand 6103 from the virtual sword 6104. The VW controller can also include a virtual physics collider around the entirety of the virtual user 6105, ensuring that the virtual opponent's 6102 virtual sword 6104 and its associated collider cannot contact the virtual user 6105, and thus the physical sword 6004 will similarly be prevented from hitting the physical player 6007.

Some embodiments of the system of FIGS. 6A-6B may omit the virtual robot 6101 and instead consider the virtual opponent 6102 to be the virtual twin of the robot 6002. Such embodiments track the virtual hand 6103 and the VW controller instructs the PW controller to match those positions and rotations with the end effector 6003, allowing the PW controller to determine the inverse kinematics required for the movements.

For the embodiment of FIGS. 6A-6B, the PW controller generates effects in the physical twin (i.e., rotations of the PW axes of the PW robot 6002) based on effects in the virtual twin (i.e., the motions of the VW sword 6104 and the VW opponent 6102 and the rotations of the VW axes of the VW robot 6101). As such, for this embodiment, the VW controller is the master controller, and the PW controller is the slave controller. Furthermore, in this embodiment, characteristics of the virtual twin (i.e., the motions of the virtual hand 6103) are used to control activity of both the physical twin (i.e., rotations of the PW axes of the PW robot 6002) and the virtual twin (i.e., the motions of the VW sword 6104 and the VW opponent 6102 and the rotations of the VW axes of the VW robot 6101). As such, in this embodiment, the physical twin and the virtual twin both respond to VW forces. Since the VW controller is a master controller, the PW controller is a slave controller, and both the physical and virtual twins respond to VW forces, the PW robot 6002 and VW robot 6101 in this embodiment are an example of the second operating mode.

Examples: Third Operating Mode

Figure 7A:
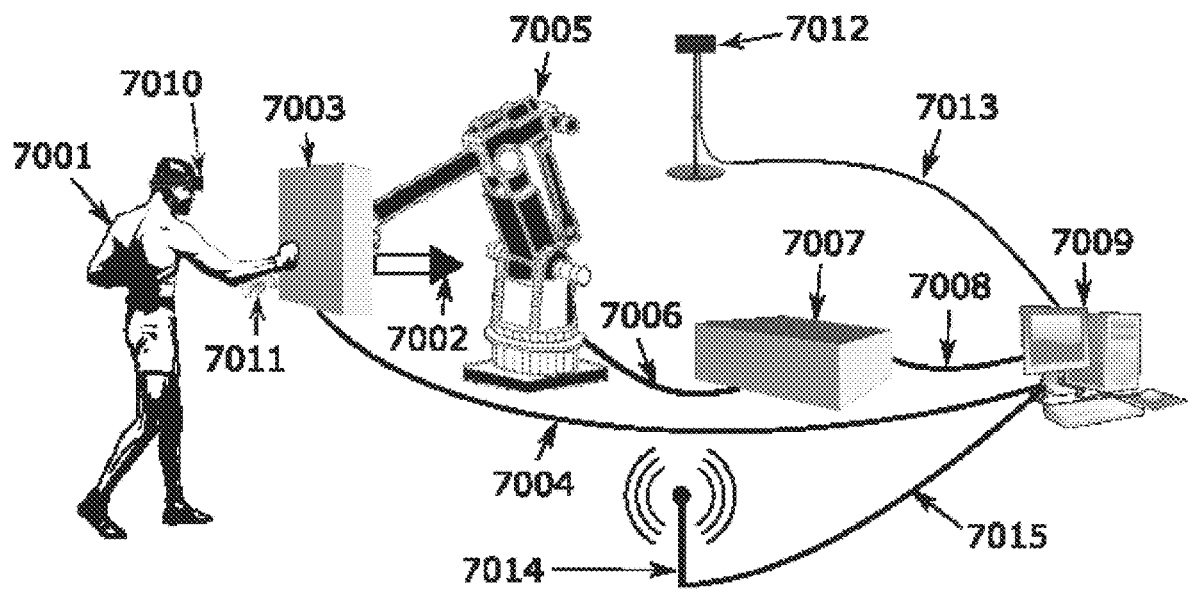
FIG. 7A depicts the physical-world components of an embodiment that uses the third operating mode.

FIG. 7A depicts the physical-world components of an embodiment that uses the third operating mode. In this particular embodiment, a user 7001 punches a pressure sensor 7003, and the punch imparts a force 7002 upon the pressure sensor 7003. The pressure sensor 7003 generates and transmits signals corresponding to that force 7002 via a wired connection 7004 to a computer 7009 that hosts a virtual-world controller. The pressure sensor 7003 is mounted as the end effector of a robot 7005 with a stationary base which receives commands via a wired connection 7006 from a physical-world controller 7007. The computer 7009 receives information from the PW controller 7007 via connection 7008, and the computer 7009 sends information back to the PW controller 7007 over the same connection 7008. The user 7001 wears a VR headset 7010 and arm tracker 7011, which are both tracked by a sensor 7012 that connects to the computer 7009 via a wired connection 7013. The VR headset 7010 receives visual output information from the wireless broadcaster 7014, which is connected to the computer 7009 via a wired connection 7015. In this embodiment, the PW controller 7007 sends power and commands to actuators (e.g., motors, not shown) in the robot 7005 via the connection 7006. The actuators in the robot 7005 can have attached or embedded sensors (not shown) that feed information over the connection 7006 back to the PW controller 7007, which can feed that information or the result of a calculation thereof over connection 7008 to the computer 7009. This information from sensors (not shown) in the robot 7005 may include position and/or angle changes as a result of recoil that is transmitted to the robot 7005 by the impact 7002.

In other embodiments, the VR headset 7010 and/or the arm tracker 7011 may have a wired connection (not shown) to the computer 7009, and/or the sensor 7012 and/or wireless broadcaster 7014 may have a wireless connection to the computer 7009, and/or the broadcaster 7014 may be integrated into the computer 7009. Some embodiments may omit (i) the VR headset 7010, (ii) the arm tracker 7011, (iii) the sensor 7012 and the sensor connection 7013, and/or (iv) the broadcaster 7014 and the broadcaster connection 7015. Some embodiments may route signals from the pressure sensor 7003 to the PW controller 7007 via a wired or wireless connection (not shown in FIG. 7A), and then via connection 7008 to computer 7009$n$ some embodiments, the robot 7005 will have a mobile base rather than a stationary base.

Figure 7B:
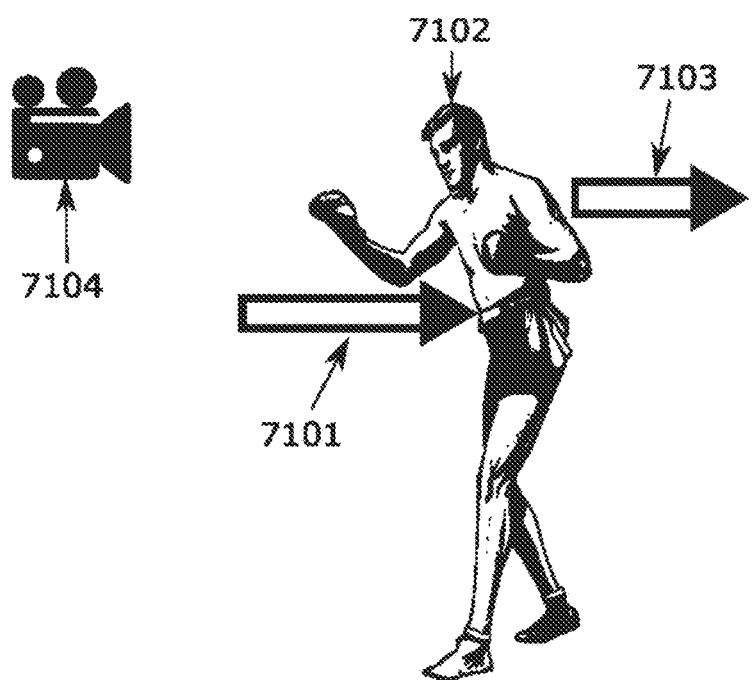
FIG. 7B depicts the virtual-world components that correspond to the embodiment of FIG. 7A.

FIG. 7B depicts the virtual-world components that correspond to the embodiment of FIG. 7A. The virtual world includes a virtual human boxer 7102. The virtual world also includes a virtual camera 7104 that is moved in the virtual world to match the position and orientation of the VR headset 7010, and this camera's view is shown to the user 7001 via the VR headset 7010. Note that the image shown in FIG. 7B is not the image shown to the user 7001 via the VR headset 7010; rather, it is a third-person view. Some embodiments may exclude this virtual camera 7104. The PW force 7002 that was measured in the physical world by the sensor 7003 is simulated in the virtual world as an equivalent virtual force 7101 applied to the virtual boxer 7102. This virtual boxer 7102 is simulated by the computer 7009 with a mass, center of mass, and center of balance equal to that of a real human boxer. In this particular embodiment, the simulated mass is less than the mass of the pressure sensor 7003 and robot 7005 combined. The simulation of the virtual force 7101 upon the virtual boxer 7102 causes the virtual boxer 7102 to be pushed backwards 7103. The computer 7009 determines the velocity of this VW reaction 7103 and sends signals corresponding to that movement via connection 7008 to the PW controller 7007. The PW controller 7007 sends commands via connection 7006 to actuators (not shown) on the robot 7005 to move the pressure sensor 7003 with a PW velocity that matches the VW reaction movement 7103 of the virtual boxer 7102. One potential use of this embodiment is to accurately measure and model the force of a punch upon an opponent by using machines that are substantially dissimilar from such an opponent.

Figure 7C:
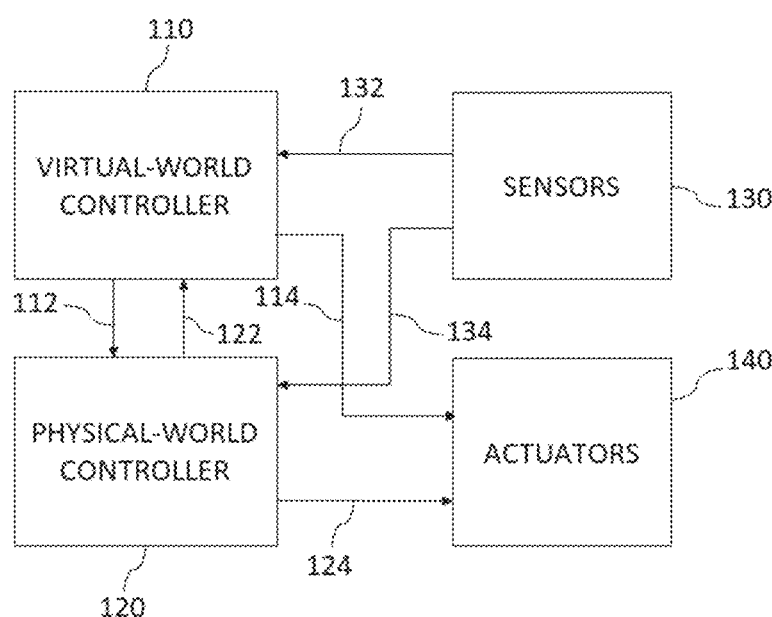
FIG. 7C depicts the portions of the robotic VR system of FIG. 1 that are used in the embodiment depicted in FIGS. 7A and 7B.

FIG. 7C depicts the portions of the robotic VR system 100 of FIG. 1 that are used in the embodiment depicted in FIGS. 7A and 7B. In FIG. 7C:

- The VW controller 110 of FIGS. 1 and 7C corresponds to the computer 7009 of FIG. 7A;
- The PW controller 120 of FIGS. 1 and 7C corresponds to the PW controller 7007 of FIG. 7A;
- The sensors 130 of FIGS. 1 and 7C correspond to the pressure sensor 7003 and the sensor 7012 of FIG. 7A;
- The actuators 140 of FIGS. 1 and 7C correspond to audio and video rendering components (not shown) in the VR headset 7010 and the motors (not shown) in the robot 7005 of FIG. 7A;
- The link 132 of FIGS. 1 and 7C corresponds to the data paths, including the wired connections 7004 and 7013, from the pressure sensor 7003 and the sensor 7012 to the computer 7009 of FIG. 7A;
- The link 134 of FIGS. 1 and 7C corresponds to the wired connection 7006 from the sensors in the axes (not shown) of robot 7005 to the PW controller 7007;
- The links 112 and 122 of FIGS. 1 and 7C correspond to the connection 7008 of FIG. 7A;
- The link 114 of FIGS. 1 and 7C correspond to the data path, including the wired connection 7015, from the computer 7009 and the broadcaster 7014 to the VR headset 7010; and
- The link 124 of FIGS. 1 and 7C corresponds to the data path, including the wired connection 7006, from the PW controller 7007 to the motors in the robot 7005 of FIG. 7A.

For the embodiment of FIGS. 7A-7C, the PW controller 120 (i.e., the PW controller 7007) applies effects to the physical world (i.e., movement of the pressure sensor 7003 of FIG. 7A) based on effects in the virtual world (i.e., the motions of the virtual boxer 7102 of FIG. 7B). The effects in the virtual world are caused by the simulation of forces that were sensed in the physical world (i.e., the force 7002 of the boxer's 7001 punch). As such, for this embodiment, the VW controller 110 (i.e., the computer 7009) is the master controller, and the PW controller 120 (i.e., the PW controller 7007) is the slave controller. Furthermore, in this embodiment, characteristics of the physical world (i.e., the PW force 7002) are simulated in the virtual world to control the activity in the virtual world (i.e., the motion of the virtual boxer 7102). As such, in this embodiment, the physical world and the virtual world both respond to PW forces. Since the VW controller 110 is a master controller, the PW controller 120 is a slave controller, and both the physical and virtual worlds respond to PW forces, this embodiment is an example of the third operating mode.

If this embodiment responded to VW forces rather than PW forces, then the physical robot 7005 would be immobile unless the forces were generated by computer scripts in the VW controller. If the embodiment used the PW controller to control the VW controller, then the user 7001 would feel the much harder impact 7002 of punching into the force sensor 7003 held by a heavy robot 7005, and the virtual boxer 7102 would be moved by only the small distance—if any—that the user 7001 would be able to overpower the robot 7005.

Examples: Fourth Operating Mode

Figure 8A:
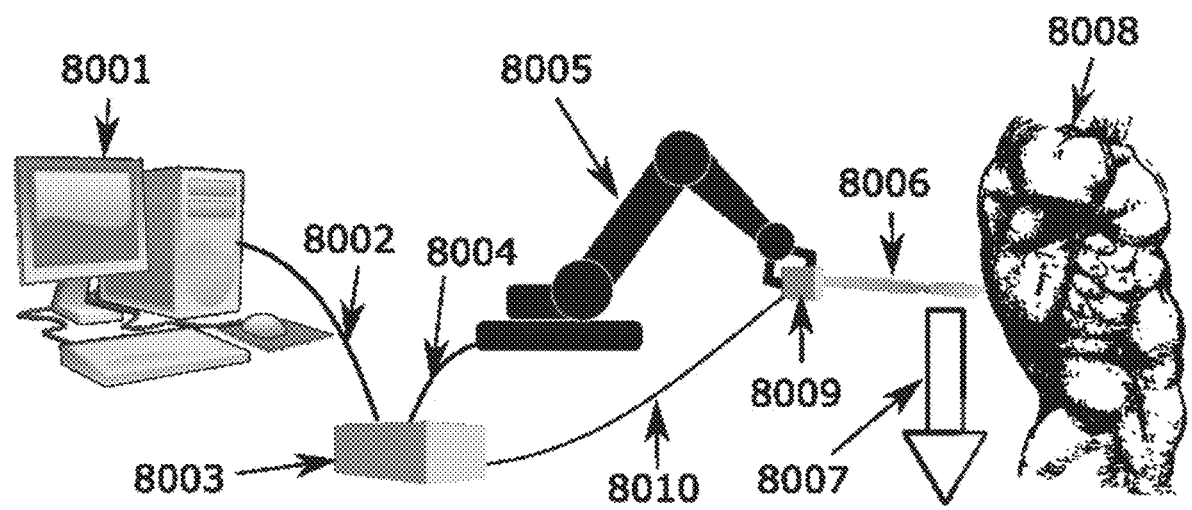
FIG. 8A depicts the physical-world components of an embodiment that uses the fourth operating mode.

FIG. 8A depicts the physical-world components of an embodiment that uses the fourth operating mode for a robotic surgery. In this particular embodiment, the VW controller hosted on a computer 8001 generates a virtual twin (8101 of FIG. 8B) of the PW robot 8005 and uses an inverse kinematics function to generate the axis (not shown) movements necessary to move the end effector sensor 8009 of the robot 8005 downwards with a specified amount of force 8007. These instructions are sent via a wired connection 8002 to a PW controller 8003, which then instructs the robot 8005 via a wired connection 8004 to move a scalpel 8006 downwards along the patient 8008. A sensor 8009 attached to the scalpel 8006 measures the amount of force applied and sends signals corresponding to that measured force back to the PW controller 8003 via a wired connection 8010, and the robot 8005 sends its own position information back to the PW controller 8003 over the connection 8004. The PW controller 8003 controls and adjusts the movements of the robot 8005 to ensure that the scalpel 8006 maintains the specified force 8007. The PW controller 8003 sends data corresponding to the position of the scalpel 8006 over the connection 8002 back to the computer 8001, which adjusts the position of the virtual robot 8101 to match the position of the PW robot 8005. This embodiment allows the resistance and feedback from the physical world to affect the instructions that are generated within the virtual world.

Figure 8B:
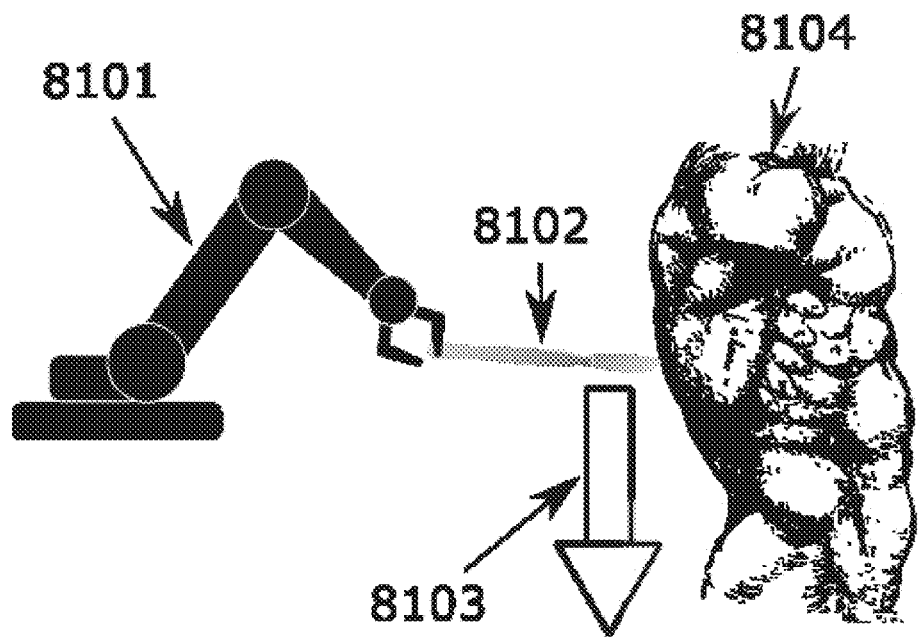
FIG. 8B depicts the virtual-world components that correspond to the embodiment of FIG. 8A.

FIG. 8B depicts the virtual-world components that correspond to the embodiment of FIG. 8A. In particular, the virtual model 8101 of the physical robot 8005 holds a virtual model 8102 of the physical scalpel 8006. The virtual scalpel 8102 is used on a virtual model 8104 of the physical patient 8008 as required by a saved instruction set or from a system operator. The presently depicted instruction is to move the virtual scalpel 8102 downwards with a specified force 8103 along the virtual patient 8104. The axis rotations of the virtual robot 8101 are set to match the axis rotations of the physical robot 8005. The virtual model 8104 of the physical patient 8008 may be generated with information collected from measurements or scans of the patient, may be constructed with information from anatomy databases, and/or may be generated by other methods.

In some embodiments, a subsequent instruction for the virtual robot 8101 may be to halt when the virtual scalpel 8102 reaches a specified position on the virtual patient 8104. Such a setup allows the physical robot 8005 to make the incision with a controlled force and stop at a designated point, even if the physical robot 8005 does not have any way to observe or monitor the physical patient 8008. Instead, the system depends upon the accuracy of the virtual model 8104 of the physical patient 8008. This approach is particularly useful for internal surgeries, where it is harmful to the patient to make incisions large enough to see the progress of the surgical tools. Instead, the virtual patient 8104 includes internal anatomy and thus allows the progress to be inferred and observed via visualizations. This setup allows the physical robot 8005 to 'feel' its way through a surgery, while using the virtual models to visualize the internal organs and guide the operation.

Figure 8C:
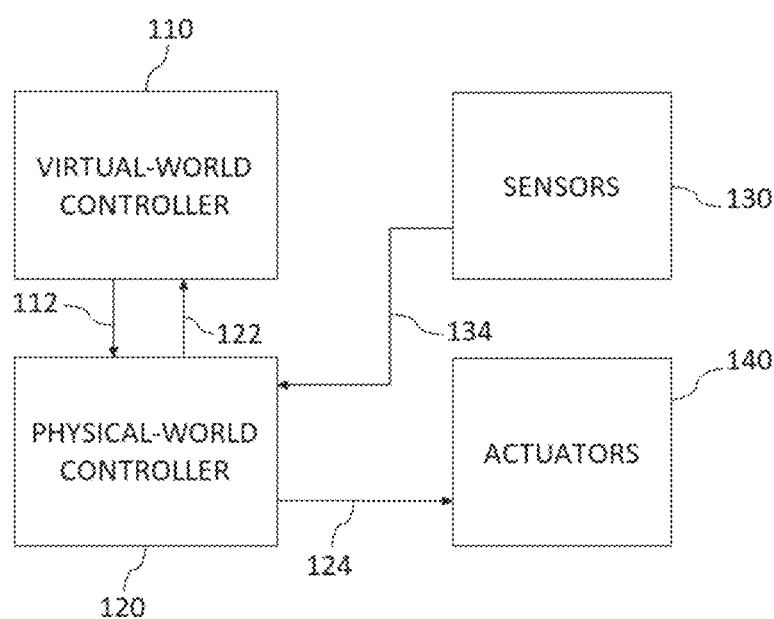
FIG. 8C depicts the portions of the robotic VR system of FIG. 1 that are used in the embodiment depicted in FIGS. 8A and 8B.

FIG. 8C depicts the portions of the robotic VR system 100 of FIG. 1 that are used in the embodiment depicted in FIGS. 8A and 8B. In FIG. 8C:

- The VW controller 110 of FIGS. 1 and 8C corresponds to the computer 8001 of FIG. 8A;
- The PW controller 120 of FIGS. 1 and 8C corresponds to the PW controller 8003 of FIG. 8A;
- The sensors 130 of FIGS. 1 and 8C correspond to the force sensor 8009 and axis sensors (not shown) in the robot 8005 of FIG. 8A;

The actuators 140 of FIGS. 1 and 8C correspond to axis motors (not shown) in the robot 8005 of FIG. 8A;

The link 134 of FIGS. 1 and 8C corresponds to the data paths, including the wired connections 8010 and 8004, from the force sensor 8009 and the axis sensors in the robot 8005 to the PW controller 8003 of FIG. 8A, respectively;

The links 112 and 122 of FIGS. 1 and 8C correspond to the connection 8002 of FIG. 8A; and The link 124 of FIGS. 1 and 8C corresponds to the wired connection 8004 from the PW controller 8003 to the axis motors in the robot 8005 of FIG. 8A.

For the embodiment of FIGS. 8A-8C, the VW controller 110 (i.e., the computer 8001) generates effects in the virtual world (i.e., movement of the virtual scalpel 8102 of FIG. 8B) based on effects in the physical world (i.e., the motions of the PW scalpel 8006 of FIG. 8A). As such, for this embodiment, the PW controller 120 (i.e., the PW controller 8003) is the master controller, and the VW controller 110 (i.e., the computer 8001) is the slave controller. Furthermore, in this embodiment, characteristics of the virtual world (i.e., the VW force 8103) are used to control activity in both the physical world (i.e., the motion of the PW scalpel 8006) and the virtual world (i.e., the motion of the virtual scalpel 8102). As such, in this embodiment, the physical world and the virtual world both respond to VW forces. Since the PW controller 120 is a master controller, the VW controller 110 is a slave controller, and both the physical and virtual worlds respond to VW forces, this embodiment is an example of the fourth operating mode.

Figure 9A:
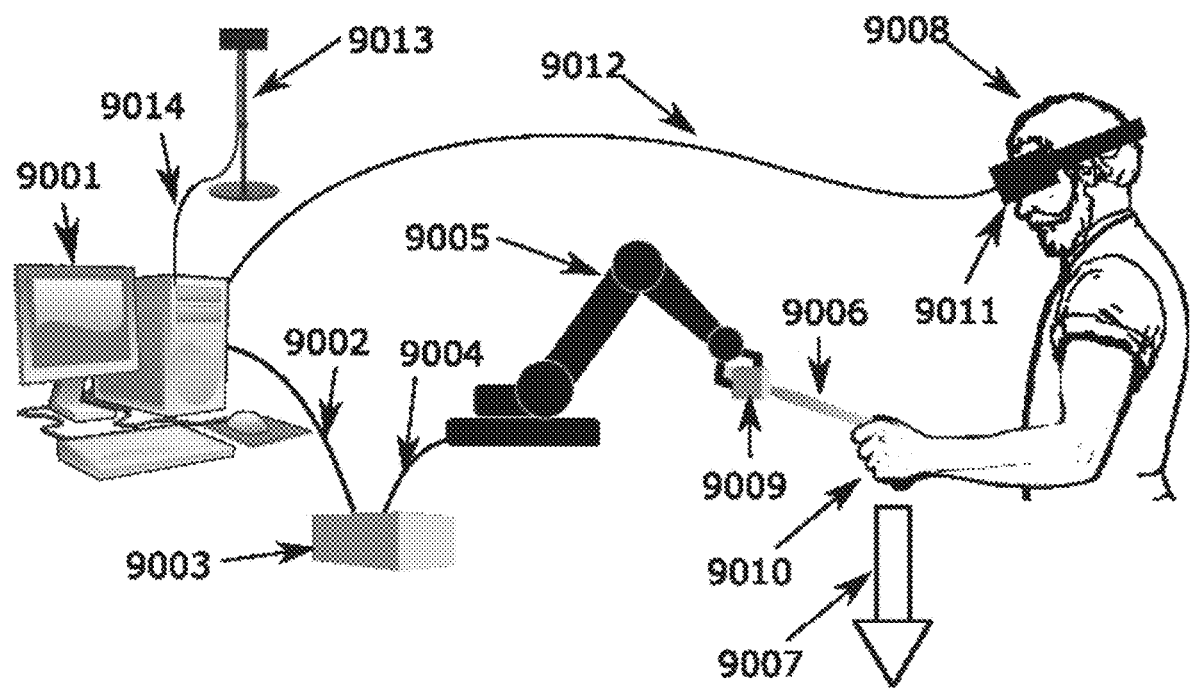
FIG. 9A depicts the physical-world components of another embodiment that uses the fourth operating mode.

FIG. 9A depicts the physical-world components of another embodiment that uses the fourth operating mode for a surgical training simulator. In this particular embodiment, a user 9008, grasps a surgical tool 9006 in his hand 9010 and wears a VR headset 9011 on his head. A robot 9005 holds the other end of the surgical tool 9006 in an end effector 9009. A sensor 9013 tracks the position and orientation of the headset 9011 and transmits that information via a wired connection 9014 to a computer 9001 that hosts a VW controller. The VW controller uses the sensed position and location of the headset 9011 to send a corresponding image of the virtual scene over a wired or wireless connection 9012 to the headset 9011 for the user 9008 to view. In the instance depicted in FIG. 9A, the user 9008 is moving the surgical tool 9006 downwards 9007. Similar to FIG. 5A, the robot 9005 tracks the position and orientation of the tool 9006 and end effector 9009 by monitoring the angles of its joint axes (not shown) and transmits that information via a wired connection 9004 to the PW controller 9003, which transmits that information to the computer 9001. The VW controller tracks changes in this position and rotation information and determines (by a method that will be described in the subsequent paragraph) an amount of resistance force that should be applied to the surgical tool 9006. The computer 9001 sends information via connection 9002 instructing the PW controller 9003 to apply this resistance force, and the PW controller 9003 sends power and commands via connection 9004 to the robot 9005 to apply that resistance force via the robot's joint actuators (not shown). This thus creates an amount of resistance or force feedback to the movement of the surgical tool 9006 in the hand 9010 of the user 9008.

Figure 9B:
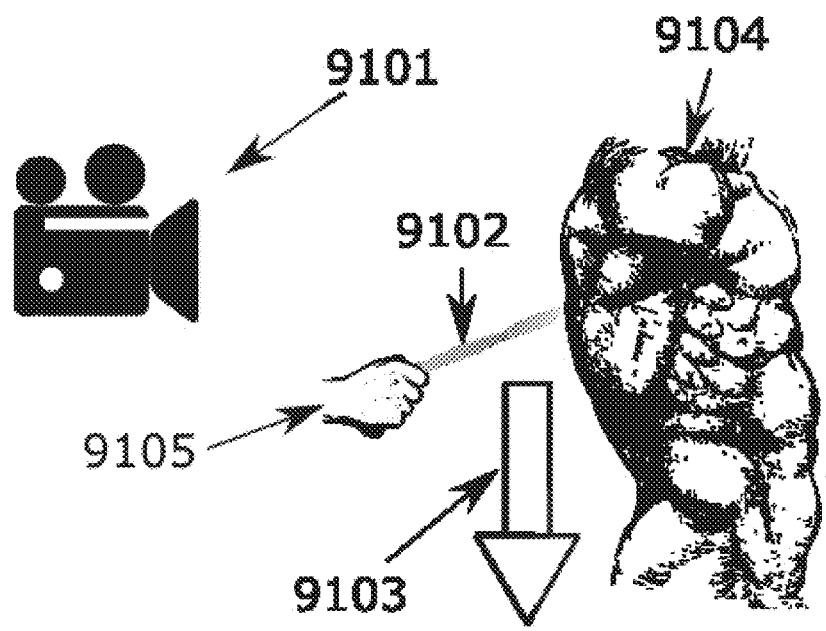
FIG. 9B depicts the virtual-world components that correspond to the embodiment of FIG. 9A.

FIG. 9B depicts the virtual-world components that correspond to the embodiment of FIG. 9A. The virtual world includes a virtual patient 9104. The virtual world also includes a virtual camera 9101 that is moved in the virtual world to match the position and orientation of the VR headset 9011, and this camera's view is shown to the user 9008 via the VR headset 9011. The position and orientation of the virtual surgical tool 9102 is set in the virtual world using the position and orientation data acquired from the robot 9005 joints to match the position and orientation of the surgical tool 9006. A representation of the hand 9010 is included as a virtual hand 9105 attached to the virtual surgical tool 9102. The virtual world contains or has access to a database or dataset (not shown) that includes information on the anatomical and physical properties of the organs of the human body. That information can include data such as shape, size, density, movements (such as heartbeat or lung expansion and contraction), flexibility, brittleness, organ type (such as bone, nerve, artery, etc.), cohesion, reactions (such as skin bleeding when cut, muscles contracting when given an electric shock, etc.), common symptoms, and other properties. For this downward motion 9007 with the tool 9006 in this embodiment, the VW controller would obtain the properties for skin and either get a resistance value to cutting or use data from the database to calculate such a value. For example, the database may state that the skin's resistance to cutting is a force of 2 newtons, and the VW controller would utilize this value. Alternatively, the VW controller may calculate such a resistance by retrieving values including a resistance to cutting of 1 newton per millimeter of skin thickness, a skin thickness of 2 mm on this part of the body, and a modifier that subtracts the patient's age divided by 200. The VW controller would then use these values to construct the formula: resistance in newtons=resistance per millimeter*millimeters thickness−(age/200). If, for example, the simulated patient is 50 years old, then the formula gives 1 N/mm*2 mm−(50/200)=1.5 newtons, and the VW controller would use this value. The VW controller sets this resistance value as the force that should be applied in opposition to the downward movement 9103 of the virtual surgical tool 9102 when cutting the patient 9104, and sends an instruction via connection 9002 to the PW controller 9003 to apply that force in opposition to the movement 9007 of FIG. 9A. The PW controller 9003 executes that instruction by sending power and commands via connection 9004 to the robot 9005.

FIG. 7C depicts the portions of the robotic VR system 100 of FIG. 1 that are used in the embodiment depicted in FIGS. 9A and 9B. In FIG. 7C:

The VW controller 110 of FIGS. 1 and 7C corresponds to the computer 9001 of FIG. 9A;

The PW controller 120 of FIGS. 1 and 7C corresponds to the PW controller 9003 of FIG. 9A;

The sensors 130 of FIGS. 1 and 7C correspond to the sensor 9013 and axis sensors (not shown) in the robot 9005 of FIG. 9A;

The actuators 140 of FIGS. 1 and 7C correspond to axis motors (not shown) in the robot 9005 and the headset 9011 of FIG. 9A;

The link 132 of FIGS. 1 and 7C corresponds to the data paths, including the wired connections 9014, from the sensor 9013 to the computer 9001 of FIG. 9A;

The link 134 of FIGS. 1 and 7C corresponds to the data paths, including the wired connection 9004, and the axis sensors in the robot 9005 to the PW controller 9003 of FIG. 9A, respectively;

The links 112 and 122 of FIGS. 1 and 7C correspond to the connection 9002 of FIG. 9A; and The link 114 of FIGS. 1 and 7C correspond to the data path, including the wired connection 9012, from the computer 9001 to the VR headset 9011; and The link 124 of FIGS. 1 and 7C corresponds to the wired connection 9004 from the PW controller 9003 to the axis motors in the robot 9005 of FIG. 9A.

For the embodiment of FIGS. 9A-9B, the VW controller 110 (i.e., the computer 9001) generates effects in the virtual world (i.e., the virtual environment and the virtual body 9104 of FIG. 9B) based on effects in the physical world (i.e., the motions of the PW scalpel 9006 of FIG. 9A) and saved data from a file or database. As such, for this embodiment, the PW controller 120 (i.e., the PW controller 9003) is the master controller, and the VW controller 110 (i.e., the computer 9001) is the slave controller. Furthermore, in this embodiment, characteristics of the virtual world (i.e., the VW force opposing motion 9103) are used to control activity in the physical world (i.e., the motion of the PW scalpel 9006) and the virtual world (i.e., the motion of the virtual scalpel 9102). As such, in this embodiment, the physical world and the virtual world both respond to VW forces. Since the PW controller 120 is a master controller, the VW controller 110 is a slave controller, and both the physical and virtual worlds respond to VW forces, this embodiment is an example of the fourth operating mode.

OTHER EMBODIMENTS

Some embodiments may incorporate more than one of the aforementioned operating modes within the same instance, or use different operating modes for different aspects or properties of an object within an instance. For example, in the embodiment of FIGS. 8A-8C, a tracker like the position tracker 3002 of FIG. 3A could be placed on the body 8008 and measured with a sensor like sensor 3004 of FIG. 3A to track and incorporate any movement of the patient's body 8008 during the surgery. Thus, this modified embodiment would combine a portion of the first operating mode (physical master effected by physical forces) and a portion of the fourth operating mode (physical master effected by virtual forces).

The embodiment of FIGS. 5A-5C also resolves the aforementioned problems with common industrial robots, such as 6-axis arms and 4-axis arms of which the previously described palletizing, welding, and painting robots are some examples, by tracking the position of the robot and/or a product in a virtual environment. Thus, a robot can move to the exact position of the incoming object even if the robot does not have sensors to detect that object. Instead, the location information of the incoming object is preserved in the virtual environment after each stage of production on the object, so the system knows where the object has been put on the assembly line or placed in a factory, and thus also knows where the object will be for the next stage of production. The next machine in the sequence can receive the object in the expected position or move to the last known location of the virtual object in the virtual world, and the physical object will be in this predicted location. This concept of data persistence within certain robotic systems of the present disclosure allows a lot of streamlining of real-world implementations compared to existing robotic systems.

In other embodiments that include multiple robots within a work area, certain robotic systems of the present disclosure avoid collisions by utilizing the virtual environment to (i) detect if the robots move too close to each other or will overlap and (ii) make the necessary adjustments and deflections by halting a robot or diverting the robot to follow a different path found via inverse kinematics. Note that all of this is done without the robots needing sensors to detect one another directly. This pairing of industrial robots with virtual twins also allows a supervisor to interact with or observe a physical robot via its virtual twin.

Techniques of the present disclosure can also simplify data collection, because much information is already digitized in the virtual environment and thus easier to collect and store. This data can include (without limitation) data collected from the virtual components corresponding to a user, from the virtual embodiment of the robot(s), from products and production work, and/or from other environmental elements. The data can be combined with data from elements in the physical environment and/or from external sources that are not part of the modeled environment.

In certain embodiments, a system generates a virtual environment in which components and their movements correspond to objects within a physical environment, the system comprising:
- a data storage device storing a set of structural and movement characteristics for a robot;
- a processor on a computer system capable of extracting the data defining structural, kinematic, dynamic, and movement characteristics for the robot;
- an electronic memory storing a dataset for the robot including a kinematic or dynamic structure and further defining a range of motion for the robot;
- A processor that uses information regarding the physical object to generate the virtual environment and virtual robot In certain embodiments, a system comprises a virtual-world (VW) controller and a physical-world (PW) controller connected to communicate with the VW controller. At least one of the VW controller and the PW controller is configured to receive measurements from one or more sensors characterizing aspects of a physical world. The VW controller is configured to generate a virtual twin in a virtual world. At least one of the VW controller and the PW controller is configured to generate commands for one or more actuators affecting aspects of the physical world. At least one of (i) the VW controller controls the virtual twin based on a corresponding physical twin in the physical world and (ii) the PW controller controls physical twin based on the virtual twin, to coordinate the corresponding virtual and physical twins in the respective virtual and physical worlds.

In some or all of the above embodiments, the system further comprises at least one of the one or more sensors.

In some or all of the above embodiments, the system further comprises at least one of the one or more actuators.

In some or all of the above embodiments, the PW controller is a master controller that controls the physical twin independent of the virtual twin; the VW controller is a slave controller that controls the virtual twin dependent on the physical twin; and the PW and VW controllers control the physical and virtual twins based on one or more PW forces.

In some or all of the above embodiments, the PW controller is a slave controller that controls the physical twin dependent on the virtual twin; the VW controller is a master controller that controls the virtual twin independent of the physical twin; and the PW and VW controllers control the physical and virtual twins based on one or more VW forces.

In some or all of the above embodiments, the PW controller is a slave controller that controls the physical twin dependent on the virtual twin; the VW controller is a master controller that controls the virtual twin independent of the physical twin; and the PW and VW controllers control the physical and virtual twins based on one or more PW forces.

In some or all of the above embodiments, the PW controller is a master controller that controls the physical twin independent of the virtual twin; the VW controller is a slave controller that controls the virtual twin dependent on the physical twin; and the PW and VW controllers control the physical and virtual twins based on one or more VW forces.

In some or all of the above embodiments, the signals received from at least one sensor characterize motion of the physical twin.

In some or all of the above embodiments, the physical twin is a robot.

In some or all of the above embodiments, at least one virtual twin of the robot is a non-robot character.

In some or all of the above embodiments, the physical twin is a user of the system.

In some or all of the above embodiments, the commands for at least one actuator affect motion of the physical twin.

In some or all of the above embodiments, the commands cause the physical twin to deviate from a pre-programmed routine.

In some or all of the above embodiments, the commands for at least one actuator affect rendering of the virtual world to a user of the system.

In some or all of the above embodiments, the at least one actuator is a VW headset.

In some or all of the above embodiments, at least one of the VW and PW controllers is configured to perform collision avoidance processing.

In some or all of the above embodiments, the collision avoidance processing prevents collisions between two PW elements.

In some or all of the above embodiments, at least one of the VW and PW controllers is configured to moderate collisions between two PW elements.

In some or all of the above embodiments, at least one of the VW and PW controllers is configured to provide at least one of information and instructions to a user of the system.

In some or all of the above embodiments, at least one of the VW and PW controllers is configured to collect and organize data about at least one of the virtual and physical worlds.

In some or all of the above embodiments, at least one of the VW and PW controllers is configured to control its twin in real time with respect to the corresponding twin.

Embodiments of the invention/disclosure may be implemented as (analog, digital, or a hybrid of both analog and digital) circuit-based processes, including possible implementation as a single integrated circuit (such as an ASIC or an FPGA), a multi-chip module, a single card, a multi-card circuit pack, or a system comprised with multiple discrete circuits. As would be apparent to one skilled in the art, various functions of circuit elements may also be implemented as processing blocks in a software program. Such software may be employed in, for example, a digital signal processor, micro-controller, general-purpose computer, or other processor.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding terminals, nodes, ports, or paths may be referred to by the same name and are interchangeable for purposes here.

As will be appreciated by one of ordinary skill in the art, the present invention/disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention/disclosure may take the form of an entirely software embodiment (including firmware, resident software, micro-code, and the like), an entirely hardware embodiment, or an embodiment combining software and hardware aspects that may generally be referred to herein as a "system."

Embodiments of the invention/disclosure can be manifest in the form of methods and apparatuses for practicing those methods. Embodiments of the invention/disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention/disclosure. Embodiments of the invention/disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention/disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention/disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Digital information can be communicated between machines on a network or between programs on a machine or network via virtually any protocol or method. Inter-Process Communication methods may include, but are not limited to, TCP/IP, UDP, anonymous or named pipes, registry entries, Remote Procedure Calls, COM (Component Object Model), sockets, shared memory, clipboard, and others. The communication protocols and formats used with these methods can be of virtually any implementation and include, but are not limited to, binary, JSON, XML, POST, SOAP, HTTP, APIs, and others.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention/disclosure may be made by those skilled in the art without departing from embodiments of the invention/disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention/disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention/disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A system comprising:
   a master controller that controls motion of a master twin in a master world; and
   a slave controller that communicates with the master controller and controls motion of a slave twin in a slave world, wherein:
      slave-world force data corresponding to a force applied to the slave twin in the slave world is provided to the master controller;
      the master controller controls the motion of the master twin based on the slave-world force data;
      master-world motion data corresponding to the motion of the master twin in the master world is provided to the slave controller; and
      the slave controller uses the master-world motion data to control the motion of the slave twin in the slave world to match the motion of the master twin in the master world, wherein:
         the master world is a virtual world (VW);
         the master controller is a VW controller;
         the master twin is a virtual twin;
         the slave world is a physical world (PW);
         the slave controller is a PW controller; and
         the slave twin is a physical twin.

2. The system of claim 1, wherein:
the PW controller receives other VW motion data corresponding to other motion of the virtual twin that is not based on a PW force applied to the physical twin in the physical world; and
the PW controller uses the other VW motion data to control the motion of the physical twin to match the motion of the virtual twin.

3. The system of claim 1, wherein the PW controller controls motion of the physical twin such that collisions involving the physical twin are avoided in the physical world.

4. The system of claim 1, further comprising one or more sensors configured to generate sensor measurements corresponding to the physical world.

5. The system of claim 4, further comprising one or more actuators configured to move the physical twin.

6. The system of claim 1, further comprising one or more actuators configured to move the physical twin.

7. The system of claim 1, wherein the physical twin is a robot.

8. A computer-implemented method for controlling (i) motion of a master twin in a master world and (ii) motion of a slave twin in a slave world, the method comprising:
providing slave-world force data corresponding to a force applied to the slave twin in the slave world;
controlling the motion of the master twin based on the slave-world force data;
providing master-world motion data corresponding to the motion of the master twin in the master world; and
using the master-world motion data to control the motion of the slave twin in the slave world to match the motion of the master twin in the master world, wherein:
the master world is a virtual world (VW);
the master twin is a virtual twin;
the slave world is a physical world (PW); and
the slave twin is a physical twin.

9. The method of claim 8, further comprising:
providing other VW motion data corresponding to other motion of the virtual twin that is not based on a PW force applied to the physical twin in the physical world; and
using the other VW motion data to control the motion of the physical twin to match the motion of the virtual twin.

10. The method of claim 8, wherein motion of the physical twin is controlled such that collisions involving the physical twin are avoided in the physical world.

11. The method of claim 8, wherein the physical twin is a robot.

* * * * *